US008858783B2

(12) United States Patent
Morris

(10) Patent No.: US 8,858,783 B2
(45) Date of Patent: Oct. 14, 2014

(54) HYDROCARBON SYNTHESIZER

(75) Inventor: Martin Allan Morris, Monticello, IL (US)

(73) Assignee: Neo-Petro, LLC, Rantoul, IL (US)

(*) Notice: Subject to any disclaimer, the term of this patent is extended or adjusted under 35 U.S.C. 154(b) by 1058 days.

(21) Appl. No.: 12/888,023

(22) Filed: Sep. 22, 2010

(65) Prior Publication Data
US 2011/0067305 A1    Mar. 24, 2011

Related U.S. Application Data

(60) Provisional application No. 61/244,797, filed on Sep. 22, 2009.

(51) Int. Cl.
*C10G 47/22* (2006.01)
*C10G 3/00* (2006.01)
*C10G 9/00* (2006.01)

(52) U.S. Cl.
CPC .. *C10G 3/40* (2013.01); *C10G 9/00* (2013.01); *C10G 47/22* (2013.01); *C10G 3/50* (2013.01); C10G 2300/1037 (2013.01); C10G 2300/1003 (2013.01); C10G 2300/1014 (2013.01); C10G 2300/1018 (2013.01); C10G 2300/1025 (2013.01); C10G 2300/1051 (2013.01); C10G 2300/1062 (2013.01)
USPC ........................................................ 208/107

(58) Field of Classification Search
USPC ........................................................ 208/107
See application file for complete search history.

(56) References Cited

U.S. PATENT DOCUMENTS

| | | | |
|---|---|---|---|
| 1,687,595 A * | 10/1928 | Shore ............................ 208/107 |
| 2,813,138 A | 11/1957 | Macqueen |
| 2,843,530 A | 7/1958 | Langer, Jr. et al. |
| 2,873,245 A | 2/1959 | Thompson et al. |
| 4,206,032 A | 6/1980 | Friedman et al. |
| 4,217,112 A | 8/1980 | Johanson |
| 4,243,509 A | 1/1981 | Sinor |
| 4,252,634 A | 2/1981 | Khulbe et al. |
| 4,288,405 A | 9/1981 | Koch |
| 4,316,873 A | 2/1982 | Koch |
| 4,344,835 A | 8/1982 | Koch |
| 4,411,871 A | 10/1983 | Gulbrandsen et al. |
| 4,797,197 A | 1/1989 | Mallari |
| 4,995,961 A | 2/1991 | Hays et al. |
| 5,096,566 A | 3/1992 | Dawson et al. |
| 5,133,941 A | 7/1992 | Hays et al. |
| 5,244,638 A | 9/1993 | Morris |
| 5,262,044 A | 11/1993 | Huizinga et al. |
| 5,432,265 A | 7/1995 | Tomasula |
| 5,660,715 A | 8/1997 | Trimble et al. |
| 5,792,340 A | 8/1998 | Freel et al. |
| 5,851,381 A * | 12/1998 | Tanaka et al. ............. 208/210 |
| 5,914,027 A | 6/1999 | Ellingsen |
| 5,914,029 A | 6/1999 | Verachtert, II |
| 6,359,177 B1 | 3/2002 | Brady et al. |
| 6,485,631 B1 | 11/2002 | Ellingsen |
| 6,508,931 B1 | 1/2003 | Lin et al. |
| 6,702,935 B2 | 3/2004 | Cash et al. |
| 6,702,936 B2 | 3/2004 | Rettger et al. |
| 6,787,025 B2 | 9/2004 | Mukherjee et al. |
| 6,852,215 B2 | 2/2005 | Wen et al. |
| 7,001,502 B1 | 2/2006 | Satchwell et al. |
| 7,097,758 B2 | 8/2006 | Stell et al. |
| 7,238,274 B2 | 7/2007 | Turner |
| 7,255,785 B2 | 8/2007 | Kong et al. |
| 7,267,699 B2 | 9/2007 | Kamijo |
| 7,270,743 B2 | 9/2007 | Freel et al. |
| 7,282,139 B2 | 10/2007 | Espinoza et al. |
| 7,285,694 B2 | 10/2007 | Countz |
| 7,311,746 B2 | 12/2007 | Stell et al. |
| 7,384,539 B2 | 6/2008 | Witte |
| 7,384,541 B2 | 6/2008 | Charron et al. |
| 7,402,290 B2 | 7/2008 | Hubbell et al. |
| 7,427,381 B2 | 9/2008 | Stell et al. |
| 7,510,689 B2 | 3/2009 | Costinel |
| 7,541,504 B2 | 6/2009 | Rangarajan et al. |
| 7,550,063 B2 | 6/2009 | Gawad |
| 7,556,659 B2 | 7/2009 | Kim |
| 2002/0074261 A1 | 6/2002 | Ravella |
| 2004/0093797 A1 | 5/2004 | Bingham et al. |
| 2004/0232046 A1 | 11/2004 | Tanaka et al. |
| 2005/0211602 A1 | 9/2005 | Jorgensen |
| 2006/0073080 A1 | 4/2006 | Tonkovich et al. |
| 2006/0144760 A1 | 7/2006 | Duyvesteyn et al. |
| 2006/0264684 A1 | 11/2006 | Petri et al. |
| 2007/0085227 A1 | 4/2007 | Tonkovich et al. |
| 2007/0170095 A1 | 7/2007 | Freel et al. |
| 2008/0093259 A1 | 4/2008 | Brecher |
| 2008/0110801 A1 | 5/2008 | Yuan et al. |
| 2008/0128323 A1 | 6/2008 | McCoy et al. |
| 2008/0184915 A1 | 8/2008 | Tonkovich et al. |
| 2008/0202982 A1 | 8/2008 | Tooley |
| 2009/0008292 A1 | 1/2009 | Keusenkothen et al. |
| 2009/0011291 A1 | 1/2009 | Herling et al. |
| 2009/0050524 A1 | 2/2009 | Kim et al. |
| 2009/0071872 A1 | 3/2009 | Ginosar et al. |
| 2009/0090654 A1 | 4/2009 | Duyvesteyn et al. |
| 2009/0152166 A1 | 6/2009 | Costinel |
| 2009/0209799 A1 | 8/2009 | Etter et al. |
| 2009/0288988 A1 | 11/2009 | Mayeur et al. |

OTHER PUBLICATIONS

International Search Report dated Nov. 22, 2010 for related PCT; PCT/US 10/49860.

* cited by examiner

*Primary Examiner* — Randy Boyer
(74) *Attorney, Agent, or Firm* — Thomas C. Meyers; Brown Rudnick LLP

(57) ABSTRACT

A hydrocarbon synthesizer system for the production of petroleum fractions from a feedstock. Methods of synthesizing hydrocarbons from a feedstock.

10 Claims, 14 Drawing Sheets

FIG. 6A

Components listed in chromatographic order

| Time | Index | Component | Mass % | Vol % | Mol % |
|---|---|---|---|---|---|
| 2.645 | 385.0 | butene-1 | 0.1178 | 0.1540 | 0.3066 |
| 3.714 | 487.0 | pentene-1 | 0.0806 | 0.0979 | 0.1679 |
| 4.241 | 517.2 | 3,3-dimethylbutene-1 | 0.0584 | 0.0698 | 0.1216 |
| 4.533 | 530.5 | 2,2-dimethylbutane | 0.0720 | 0.0863 | 0.1221 |
| 4.997 | 550.0 | cyclopentene | 0.0619 | 0.0706 | 0.1075 |
| 6.022 | 587.4 | 2-methylpentene-1 | 0.5740 | 0.6520 | 0.9956 |
| 6.415 | 600.0 | n-Hexane | 0.0929 | 0.1096 | 0.1574 |
| 7.531 | 628.1 | methylcyclopentane | 0.0986 | 0.1024 | 0.1711 |
| 8.026 | 639.2 | 3,4-dimethylpentene | 0.0809 | 0.0896 | 0.1203 |
| 8.595 | 651.2 | 1-methylcyclopentene | 0.1797 | 0.1793 | 0.3194 |
| 8.655 | 652.4 | benzene | 0.5586 | 0.4944 | 1.0443 |
| 9.352 | 666.0 | 4-methyl-2-hexene | 0.1019 | 0.1083 | 0.1516 |
| 9.968 | 677.1 | 3,4-dimethyl-c-pentene-2 | 0.2034 | 0.2203 | 0.3024 |
| 10.561 | 687.2 | 1t,3-dimethylcyclopentane | 0.1728 | 0.1795 | 0.2571 |
| 10.711 | 689.7 | 1t,2-dimethylcyclopentane | 0.8721 | 0.9028 | 1.2969 |
| 11.294 | 699.0 | t-heptene-3 | 0.1102 | 0.1220 | 0.1639 |
| 11.361 | 700.0 | n-heptane | 0.2088 | 0.2376 | 0.3043 |
| 11.620 | 704.7 | t-heptene-2 | 0.1132 | 0.1248 | 0.1684 |
| 11.968 | 710.8 | 2,4,4 trimethyl 2-Pentene | 0.1166 | 0.1296 | 0.1517 |
| 12.602 | 721.5 | 2,2-dimethylhexane | 0.2094 | 0.2343 | 0.2678 |
| 13.542 | 736.4 | 2,5-dimethylhexane | 0.4515 | 0.5064 | 0.5774 |
| 13.655 | 738.1 | 3,3-dimethylhexane | 0.1297 | 0.1409 | 0.1659 |
| 14.166 | 745.7 | 2,3,3 trimethylpentane | 0.2552 | 0.2761 | 0.3264 |
| 14.930 | 756.6 | -- | 3.0506 | 3.2406 | 4.5954 |
| 15.790 | 768.2 | 2-methyl-3-ethylpentane | 0.3778 | 0.4126 | 0.4831 |
| 16.738 | 780.3 | 3-ethylhexane | 0.1707 | 0.1860 | 0.2182 |
| 17.315 | 787.4 | 2,2,5-trimethylhexane | 0.3653 | 0.4018 | 0.4158 |
| 17.609 | 790.8 | 1-ethyl-3-methyl cyclopentane | 1.1463 | 1.1431 | 1.4919 |
| 18.142 | 797.0 | 1t,2-dimethylcyclohexane | 0.1404 | 0.1407 | 0.1827 |
| 18.405 | 800.0 | n-octane | 0.2553 | 0.2827 | 0.3263 |
| 18.626 | 804.7 | 1-propylcyclopentane | 0.1952 | 0.1956 | 0.2541 |
| 19.658 | 826.0 | 2,3,5-trimethylhexane | 0.0785 | 0.0846 | 0.0894 |
| 19.731 | 827.5 | Isoparaffin 828 | 0.0880 | 0.0963 | 0.1002 |
| 19.874 | 830.3 | 2,2-dimethylheptane | 0.1353 | 0.1481 | 0.1540 |
| 20.039 | 833.6 | 1,1,4-trimethylcyclohexane | 0.1222 | 0.1231 | 0.1414 |
| 21.086 | 853.7 | 2,3,3-trimethylhexane | 0.1630 | 0.1767 | 0.1855 |
| 21.164 | 855.2 | O855 | 0.0774 | 0.0881 | 0.0895 |
| 21.261 | 857.0 | ethylbenzene | 1.5016 | 1.3472 | 2.0654 |
| 21.523 | 861.8 | Isoparaffin 860 | 0.2482 | 0.2645 | 0.2825 |
| 21.705 | 865.1 | p-xylene | 1.4978 | 1.3530 | 2.0601 |
| 21.760 | 866.1 | m-xylene | 0.7968 | 0.7171 | 1.0959 |
| 21.937 | 869.3 | 2-methyloctane | 0.3628 | 0.3955 | 0.4129 |
| 22.079 | 871.9 | 4-methyloctane | 0.5465 | 0.5902 | 0.6220 |
| 22.183 | 873.7 | 3,4-dimethylheptane | 0.1490 | 0.1584 | 0.1695 |
| 22.453 | 878.5 | 3-methyloctane | 0.1163 | 0.1255 | 0.1324 |
| 22.582 | 880.8 | Styrene | 1.2540 | 1.0730 | 1.7582 |
| 22.646 | 881.9 | 1c,2t,4c-trimethylcyclohexane | 0.1825 | 0.1838 | 0.2112 |
| 22.826 | 885.0 | o-xylene | 1.4781 | 1.3061 | 2.0330 |
| 22.966 | 887.5 | 1c,2c,3o,4-TetramethylCyC5 | 0.2496 | 0.2489 | 0.2887 |
| 23.198 | 891.4 | 1t,2-Diethylcyclopentane | 1.4044 | 1.4004 | 1.6244 |
| 23.483 | 896.3 | t-nonene-3 | 0.2760 | 0.2925 | 0.3193 |

FIG. 6 B

Components listed in chromatographic order

| Time | Index | Component | Mass % | Vol % | Mol % |
|---|---|---|---|---|---|
| 23.569 | 897.7 | o-nonene-3 | 0.1363 | 0.1453 | 0.1577 |
| 23.707 | 900.0 | n-nonane | 0.2643 | 0.2865 | 0.3010 |
| 23.824 | 903.3 | 1,1-methylethylcyclohexane | 0.1492 | 0.1439 | 0.1726 |
| 23.992 | 908.0 | 1-Methyl-3t-ethylCyclohexane | 0.1125 | 0.1093 | 0.1301 |
| 24.292 | 916.3 | i-propylbenzene | 0.1344 | 0.1213 | 0.1633 |
| 24.461 | 920.9 | 2,4-dimethyloctane | 0.1007 | 0.1078 | 0.1033 |
| 25.072 | 937.4 | n-butylcyclopentane | 0.1223 | 0.1213 | 0.1415 |
| 25.505 | 948.8 | n-propylbenzene | 0.9468 | 0.8543 | 1.1502 |
| 25.787 | 956.1 | 1-Ethyl-3-methylbenzene | 1.0381 | 0.9292 | 1.2612 |
| 25.876 | 958.4 | Napthene 960 | 0.6972 | 0.6779 | 0.8065 |
| 25.924 | 959.7 | isoparaffin 964 | 0.4783 | 0.4299 | 0.5810 |
| 26.080 | 963.7 | 135-trimethylbenzene | 1.1638 | 1.2232 | 1.1944 |
| 26.129 | 964.9 | 3-ethyloctane | 0.4297 | 0.4517 | 0.4410 |
| 26.159 | 965.7 | - | 0.2234 | 0.2356 | 0.2293 |
| 26.219 | 967.3 | 5-methylnonane | 0.0554 | 0.0588 | 0.0569 |
| 26.401 | 971.9 | Isoparaffin 971 | 0.0607 | 0.0638 | 0.0623 |
| 26.473 | 973.7 | 1 ethyl 2 methylbenzene | 0.6825 | 0.5999 | 0.8292 |
| 26.746 | 980.5 | Napthene 982 | 0.1188 | 0.1155 | 0.0997 |
| 26.822 | 982.4 | 119 | 0.0829 | 0.0872 | 0.0851 |
| 26.917 | 984.8 | tert-butylbenzene | 0.6955 | 0.6276 | 0.7567 |
| 26.972 | 986.2 | 121 | 0.5266 | 0.5535 | 0.5405 |
| 27.023 | 987.4 | 1,2,4 trimethylbenzene | 1.1677 | 1.0500 | 1.4187 |
| 27.060 | 988.3 | Napthene 16 | 0.3187 | 0.3099 | 0.2675 |
| 27.147 | 990.5 | i-butylcyclohexane | 1.5383 | 1.5031 | 1.2910 |
| 27.237 | 992.7 | 1t-methyl-2-n-propylcyclohexan | 0.1633 | 0.1588 | 0.1371 |
| 27.299 | 994.2 | Isoparaffin 996 | 0.2012 | 0.2115 | 0.2065 |
| 27.537 | 1000.0 | n-Decane | 0.3208 | 0.3418 | 0.3292 |
| 27.604 | 1002.3 | Napthene 1002 | 0.1852 | 0.1800 | 0.1554 |
| 27.676 | 1004.7 | DiethylcycloHexane | 0.1159 | 0.1127 | 0.0973 |
| 28.008 | 1015.8 | sec-butylbenzene | 1.0017 | 0.9039 | 1.0898 |
| 28.435 | 1029.9 | Indane | 0.4869 | 0.3803 | 0.6121 |
| 28.486 | 1031.6 | 2,5-Dimethylstyrene | 0.2912 | 0.2505 | 0.3216 |
| 28.648 | 1036.8 | 132 | 1.6490 | 1.7333 | 1.5406 |
| 28.825 | 1042.6 | 134 | 0.3621 | 0.3806 | 0.3382 |
| 28.873 | 1044.1 | Napthene 1044 | 0.3632 | 0.3531 | 0.3048 |
| 28.958 | 1046.9 | 1,4-diethylbenzene | 0.3267 | 0.2948 | 0.3554 |
| 29.089 | 1051.1 | Isoparaffin 1054 | 0.6397 | 0.6724 | 0.5976 |
| 29.137 | 1052.6 | Napthene 1052 | 0.9654 | 0.9386 | 0.8102 |
| 29.392 | 1060.7 | 5 methyl decane | 4.3322 | 4.5535 | 4.0472 |
| 29.491 | 1063.9 | 1,4-dimethyl-2-ethylbenzene | 0.2802 | 0.2485 | 0.3049 |
| 29.627 | 1068.2 | 4-Methyldecane | 0.1839 | 0.1933 | 0.1718 |
| 29.703 | 1070.5 | Napthene 1070 | 0.1039 | 0.1010 | 0.0872 |
| 29.779 | 1072.9 | 2-methyldecane | 0.1170 | 0.1230 | 0.1093 |
| 29.833 | 1074.6 | 1,3-dimethyl-5-ethylbenzene | 0.3726 | 0.3293 | 0.4054 |
| 29.920 | 1077.3 | Napthene 1078 | 0.2935 | 0.2853 | 0.2463 |
| 30.025 | 1080.6 | 142 | 0.4438 | 0.4664 | 0.4146 |
| 30.107 | 1083.1 | 1,4-methyl-t-butylbenzene | 0.1963 | 0.1797 | 0.1934 |
| 30.169 | 1085.1 | Napthene 1088 | 0.2630 | 0.2557 | 0.2207 |
| 30.246 | 1087.4 | 143 | 0.1581 | 0.1661 | 0.1477 |
| 30.335 | 1090.2 | 1,2-dimethyl-3-ethylbenzene | 1.4964 | 1.3047 | 1.6281 |
| 30.456 | 1093.9 | isopentylbenzene | 0.2457 | 0.2148 | 0.2421 |

FIG. 6C

Components listed in chromatographic order

| Time | Index | Component | Mass % | Vol % | Mol % |
|---|---|---|---|---|---|
| 30.556 | 1096.9 | 2 methyl butyl benzene | 0.1078 | 0.0969 | 0.1062 |
| 30.657 | 1100.0 | n-undecane | 0.8295 | 0.8672 | 0.7750 |
| 30.698 | 1101.6 | isoparaffin 1103 | 0.5909 | 0.6177 | 0.5517 |
| 30.811 | 1106.1 | 1,4-ethyl-4-propylbenzene | 0.1895 | 0.1656 | 0.1867 |
| 30.997 | 1113.3 | Isoparaffin 1115 | 0.3948 | 0.4078 | 0.3385 |
| 31.172 | 1120.2 | Napthene 1121 | 0.7509 | 0.7301 | 0.6302 |
| 31.334 | 1126.4 | Isoparaffin 1125 | 0.1713 | 0.1770 | 0.1469 |
| 31.449 | 1130.9 | I 1133 | 0.2922 | 0.3018 | 0.2505 |
| 31.532 | 1134.1 | Isoparaffin 1132 | 0.2154 | 0.2225 | 0.1847 |
| 31.630 | 1137.8 | Divinylbenzene | 0.5159 | 0.4655 | 0.5622 |
| 31.675 | 1139.5 | Isoparaffin 1139 | 0.2849 | 0.2943 | 0.2443 |
| 31.737 | 1141.9 | Napthene 1141 | 0.0621 | 0.0604 | 0.0539 |
| 31.821 | 1145.1 | N 1144 | 0.3751 | 0.3647 | 0.3254 |
| 31.915 | 1148.7 | Isoparaffin 51 | 2.2874 | 2.3627 | 1.9614 |
| 31.972 | 1150.9 | Isoparaffin 1153 | 1.1746 | 1.2133 | 1.0072 |
| 32.059 | 1154.1 | Isoparaffin 52 | 1.1656 | 1.2040 | 0.9995 |
| 32.127 | 1156.7 | Isoparaffin 1157 | 1.3488 | 1.3932 | 1.1565 |
| 32.239 | 1160.9 | Isoparaffin 1161 | 0.4892 | 0.5053 | 0.4195 |
| 32.305 | 1163.4 | Isoparaffin 54 | 0.4202 | 0.4341 | 0.3603 |
| 32.350 | 1165.1 | Isoparaffin 1168 | 0.4043 | 0.4176 | 0.3467 |
| 32.430 | 1168.1 | Isoparaffin 1166 | 0.3421 | 0.3534 | 0.2933 |
| 32.636 | 1175.7 | A 89 | 0.0747 | 0.0653 | 0.0747 |
| 32.687 | 1177.6 | Isoparaffin 1176 | 0.1267 | 0.1309 | 0.1087 |
| 32.768 | 1180.6 | Isoparaffin 1180 | 0.0845 | 0.0873 | 0.0725 |
| 32.915 | 1186.0 | Isoparaffin 1185 | 12.5797 | 12.9940 | 10.7867 |
| 33.036 | 1190.5 | 1,4-di-n-propylbenzene | 0.3773 | 0.3297 | 0.3395 |
| 33.085 | 1192.3 | Isoparaffin 1191 | 1.2321 | 1.2727 | 1.0565 |
| 33.181 | 1195.8 | A 98 | 0.1224 | 0.1070 | 0.1102 |
| 33.363 | 1202.7 | A 100 | 0.7798 | 0.6815 | 0.7020 |
| 33.773 | 1219.7 | I 1219 | 0.2010 | 0.2068 | 0.1592 |
| 33.831 | 1222.1 | I 1222 | 0.2697 | 0.2775 | 0.2136 |
| 33.914 | 1225.5 | - | 0.1526 | 0.1461 | 0.1272 |
| 33.981 | 1228.2 | I 117 | 0.0859 | 0.0884 | 0.0681 |
| 34.103 | 1233.2 | Napthene 1233 | 0.2207 | 0.2146 | 0.1915 |
| 34.179 | 1236.3 | 1 methyl 4 isopropyl benzene | 0.1616 | 0.1458 | 0.1759 |
| 34.257 | 1239.5 | I 118 | 0.1381 | 0.1420 | 0.1093 |
| 34.386 | 1244.7 | I 1243 | 0.9841 | 1.0125 | 0.7795 |
| 34.442 | 1246.9 | Napthene 1246 | 0.2544 | 0.2473 | 0.2207 |
| 34.559 | 1251.7 | I 120 | 0.4699 | 0.4834 | 0.3722 |
| 34.673 | 1256.2 | I 121 | 0.3871 | 0.3983 | 0.3066 |
| 34.756 | 1259.6 | 1,2,3,4,5-pentamethylbenzene | 0.2930 | 0.2561 | 0.2886 |
| 34.800 | 1261.3 | I 1259 | 0.5299 | 0.5451 | 0.4197 |
| 34.982 | 1268.6 | Napthene 1274 | 0.8285 | 0.8055 | 0.7188 |
| 35.054 | 1271.4 | I 127 | 0.1906 | 0.1961 | 0.1510 |
| 35.144 | 1275.0 | I 128 | 0.3836 | 0.3947 | 0.3038 |
| 35.238 | 1278.7 | I 1277 | 0.2560 | 0.2633 | 0.2027 |
| 35.407 | 1285.3 | A 124 | 0.2329 | 0.2035 | 0.2086 |
| 35.493 | 1288.7 | I 1288 | 0.3222 | 0.3315 | 0.2552 |
| 35.556 | 1291.2 | I 1291 | 0.8114 | 0.8348 | 0.6427 |
| 35.783 | 1300.0 | n-tridecane | 4.0587 | 4.1735 | 3.2146 |
| 36.187 | 1318.3 | I 140 | 1.8640 | 1.9178 | 1.4764 |

FIG. 6D

| Components listed in chromatographic order | | | | | |
|---|---|---|---|---|---|
| Time | Index | Component | Mass % | Vol % | Mol % |
| 36.424 | 1328.9 | Isoparaffin 1330 | 0.5700 | 0.5865 | 0.4315 |
| 36.678 | 1340.2 | I 143 | 0.9548 | 0.9823 | 0.7562 |
| 37.018 | 1355.3 | BicycloN 1350 | 0.1570 | 0.1527 | 0.1362 |
| 37.238 | 1364.9 | I 155 | 0.1748 | 0.1798 | 0.1384 |
| 37.590 | 1380.2 | I 162 | 0.8695 | 0.8946 | 0.6887 |
| 37.828 | 1390.5 | N 133 | 0.8720 | 0.8478 | 0.7535 |
| 38.050 | 1400.0 | n-tetradecane | 0.6772 | 0.6906 | 0.4994 |
| 38.084 | 1401.6 | I-110 | 0.2392 | 0.2439 | 0.1764 |
| 38.141 | 1404.3 | N 1404 | 0.1326 | 0.1289 | 0.1058 |
| 38.344 | 1413.9 | I-1414 | 0.2232 | 0.2275 | 0.1646 |
| 38.434 | 1418.1 | I 1417 | 0.1470 | 0.1498 | 0.1084 |
| 38.680 | 1429.6 | N 1435 | 0.3635 | 0.3534 | 0.2901 |
| 38.821 | 1436.2 | I-123 | 0.6842 | 0.6973 | 0.5046 |
| 39.086 | 1448.5 | I 1449 | 0.0689 | 0.0703 | 0.0508 |
| 39.144 | 1451.1 | I-128 | 0.1692 | 0.1725 | 0.1248 |
| 39.263 | 1456.6 | I-131 | 0.2448 | 0.2496 | 0.1806 |
| 39.367 | 1461.4 | I-1457 | 0.8111 | 0.6308 | 0.5560 |
| 39.490 | 1467.0 | I 1466 | 0.1428 | 0.1455 | 0.1053 |
| 39.904 | 1485.8 | N 1487 | 0.4168 | 0.4052 | 0.3326 |
| 39.972 | 1488.9 | N 1489 | 0.3004 | 0.2920 | 0.2397 |
| 40.195 | 1498.9 | N 1504 | 1.3523 | 1.3148 | 1.0075 |
| 41.709 | 1561.8 | I 1563 | 0.0694 | 0.0702 | 0.0476 |
| 42.359 | 1588.0 | I 1588 | 0.2545 | 0.2574 | 0.1745 |
| 42.617 | 1598.3 | N 1597 | 0.4359 | 0.4238 | 0.3247 |
| 44.890 | 1677.6 | N 1679 | 0.0979 | 0.0951 | 0.0711 |
| 45.554 | 1700.0 | n-Heptadecane | 0.2337 | 0.2339 | 0.1419 |
| 49.200 | 1796.3 | Napthene 1796 | 0.2988 | 0.2903 | 0.1865 |

FIG. 7A

Components listed in chromatographic order

| Time | Index | Component | Mass % | Vol % | Mol % |
|---|---|---|---|---|---|
| 8.654 | 651.9 | benzene | 0.2460 | 0.2088 | 0.3843 |
| 10.405 | 684.4 | 1c,3-dimethylcyclopentane | 0.0763 | 0.0764 | 0.0948 |
| 10.559 | 687.0 | 1t,3-dimethylcyclopentane | 0.0689 | 0.0687 | 0.0856 |
| 10.708 | 689.4 | 1t,2-dimethylcyclopentane | 0.0653 | 0.0648 | 0.0811 |
| 12.603 | 721.3 | methylcyclohexane | 0.3723 | 0.3610 | 0.4625 |
| 12.770 | 724.0 | 2,2-dimethylhexane | 0.1008 | 0.1082 | 0.1077 |
| 13.325 | 732.8 | ethylcyclopentane | 0.1097 | 0.1068 | 0.1363 |
| 13.903 | 741.6 | 1c,2t,4-trimethylcyclopentane | 0.2050 | 0.2003 | 0.2229 |
| 14.424 | 749.2 | 1t,2c,3-trimethylcyclopentane | 0.1647 | 0.1595 | 0.1790 |
| 14.923 | 756.2 | Toluene | 0.2178 | 0.2219 | 0.2888 |
| 15.565 | 764.9 | 1,1,2-trimethylcyclopentane | 0.1067 | 0.1030 | 0.1160 |
| 15.899 | 769.3 | 2-methylheptane | 0.3760 | 0.4019 | 0.4017 |
| 16.030 | 771.0 | 4-methylheptane | 0.1161 | 0.1230 | 0.1241 |
| 16.537 | 777.4 | 3-methylheptane | 0.2643 | 0.2794 | 0.2824 |
| 16.762 | 780.2 | 3-ethylhexane | 5.4072 | 5.6528 | 5.7764 |
| 16.894 | 781.9 | 1t,4-dimethylcyclohexane | 1.8091 | 1.7699 | 1.9670 |
| 17.312 | 786.9 | 2,2,5-trimethylhexane | 0.4416 | 0.4658 | 0.4199 |
| 17.521 | 789.4 | 3t-ethylmethylcyclopentane | 0.5362 | 0.5215 | 0.5830 |
| 17.674 | 791.2 | 1-ethyl-3-methyl cyclopentane | 0.4628 | 0.4426 | 0.5032 |
| 17.767 | 792.3 | 2,2,4-trimethylhexane | 0.7373 | 0.7441 | 0.7011 |
| 17.930 | 794.2 | 1,1-methylethylcyclopentane | 0.0872 | 0.0846 | 0.0948 |
| 18.153 | 796.7 | 1t,2-dimethylcyclohexane | 3.2459 | 3.1205 | 3.5294 |
| 18.439 | 800.0 | n-octane | 4.2390 | 4.5015 | 4.5272 |
| 18.539 | 802.1 | N802 | 0.6412 | 0.6160 | 0.6972 |
| 18.624 | 803.9 | i-propylcyclopentane | 3.3855 | 3.2525 | 3.6811 |
| 19.051 | 812.9 | 2,4,4-trimethylhexane | 0.6095 | 0.6151 | 0.5795 |
| 19.417 | 820.4 | Napthene 820 | 0.2615 | 0.2526 | 0.2527 |
| 19.470 | 821.5 | 2,3,4-trimethylhexane | 0.1514 | 0.1528 | 0.1439 |
| 19.660 | 825.3 | 2,3,5-trimethylhexane | 0.5034 | 0.5202 | 0.4787 |
| 19.902 | 830.2 | 2,2-dimethylheptane | 0.7604 | 0.7984 | 0.7233 |
| 20.050 | 833.1 | 1,1,4-trimethylcyclohexane | 2.1526 | 2.0796 | 2.0809 |
| 20.168 | 835.4 | ethylcyclohexane | 0.1474 | 0.1403 | 0.1603 |
| 20.281 | 837.6 | n-propylcyclopentane | 4.2681 | 4.1016 | 4.6408 |
| 20.359 | 839.2 | 2,6-dimethylheptane | 8.5141 | 8.9598 | 8.0959 |
| 20.492 | 841.7 | Napthene 842 | 0.5734 | 0.5540 | 0.5541 |
| 20.649 | 844.8 | 3,5-dimethylheptane | 6.9719 | 7.1988 | 6.6295 |
| 20.715 | 846.0 | 2,5-dimethylheptane | 0.4542 | 0.4728 | 0.4319 |
| 20.775 | 847.2 | 3,3 diethyl pentane | 1.4367 | 1.4139 | 1.3640 |
| 20.867 | 848.9 | 1,1,3-trimethylcyhexane | 0.8046 | 0.7627 | 0.7778 |
| 20.933 | 850.2 | 2,3,3-trimethylhexane | 0.8591 | 0.8931 | 0.8169 |
| 21.008 | 851.6 | Napthene 855 | 1.3015 | 1.2448 | 1.2582 |
| 21.239 | 855.9 | 3,3-dimethylheptane | 0.6392 | 0.6533 | 0.6078 |
| 21.311 | 857.3 | ethylbenzene | 1.7015 | 1.4640 | 1.9552 |
| 21.461 | 860.0 | 1,3,5-trimethylcyclohexane | 4.0968 | 3.9183 | 3.9604 |
| 21.541 | 861.5 | I869 | 0.1585 | 0.1620 | 0.1507 |
| 21.625 | 863.1 | Isoparaffin 860 | 1.1499 | 1.1751 | 1.0934 |
| 21.727 | 864.9 | I864 | 2.5943 | 2.6658 | 2.4668 |
| 21.827 | 866.8 | p-xylene | 0.5041 | 0.4368 | 0.5793 |
| 21.867 | 867.5 | m-xylene | 0.3515 | 0.3034 | 0.4039 |
| 21.948 | 869.0 | 2-methyloctane | 0.5231 | 0.5470 | 0.4974 |
| 22.096 | 871.6 | 4-methyloctane | 3.7023 | 3.8349 | 3.5204 |

FIG. 7B

Components listed in chromatographic order

| Time | Index | Component | Mass % | Vol % | Mol % |
|---|---|---|---|---|---|
| 22.147 | 872.5 | 3,4-dimethylheptane | 3.9142 | 3.9924 | 3.7219 |
| 22.415 | 877.3 | 1t,2c,4-trimethylcyC6 | 1.1062 | 1.0887 | 1.0694 |
| 22.481 | 878.5 | 3-methyloctane | 5.0199 | 5.1976 | 4.7733 |
| 22.606 | 880.7 | Styrene | 0.9121 | 0.7486 | 1.0685 |
| 22.669 | 881.8 | 1c,2t,4c-trimethylcyclohexane | 1.5986 | 1.5444 | 1.5454 |
| 22.811 | 884.2 | o-xylene | 0.9885 | 0.8378 | 1.1359 |
| 22.942 | 886.5 | 1,1,2-trimethylcyclohexane | 1.0737 | 1.0012 | 1.0379 |
| 23.007 | 887.6 | 1c,2c,3c,4-TetramethylCyC5 | 0.1192 | 0.1140 | 0.1152 |
| 23.092 | 889.1 | 3,3-diethylpentane | 1.5049 | 1.5645 | 1.4344 |
| 23.145 | 890.0 | Isoparaffin 891 | 0.5142 | 0.5345 | 0.4901 |
| 23.182 | 890.6 | 1t,2-Diethylcyclopentane | 2.3900 | 2.2858 | 2.3096 |
| 23.287 | 892.4 | 1-Methyl-2&3c&t-1&n-propylCyC5 | 1.0752 | 1.0283 | 1.0390 |
| 23.377 | 894.0 | Napthene 894 | 0.6126 | 0.5712 | 0.5920 |
| 23.432 | 894.9 | 1-Methyl-4t-EthylCyclohexane | 0.6056 | 0.5647 | 0.5852 |
| 23.737 | 900.0 | n-nonane | 6.2594 | 6.5072 | 5.9539 |
| 23.888 | 904.3 | 1,1-DiethylCyclopentane | 0.7671 | 0.7244 | 0.7413 |
| 23.959 | 906.3 | 1-Methyl-3t-ethylCyclohexane | 0.1890 | 0.1763 | 0.1827 |
| 24.036 | 908.4 | 1-Methyl-2t-ethylCyC6 | 1.0312 | 0.9616 | 0.9965 |
| 24.165 | 912.0 | 1-Methyl-2c-n-propylCyC5 | 0.3019 | 0.2851 | 0.2918 |
| 24.404 | 918.7 | sec-butylcyclopentane | 0.0430 | 0.0406 | 0.0416 |
| 24.539 | 922.4 | n-PropylCycloHexane | 0.4355 | 0.4061 | 0.4208 |
| 24.583 | 923.6 | 2,4-dimethyloctane | 0.1628 | 0.1672 | 0.1396 |
| 24.657 | 925.6 | 1-Methyl-2c-ethylCyC6 | 0.0605 | 0.0571 | 0.0585 |
| 24.810 | 929.8 | 2,5-dimethyloctane | 0.1097 | 0.1121 | 0.0941 |
| 24.995 | 934.8 | Tetramethylcypentane | 0.3028 | 0.2879 | 0.2927 |
| 25.112 | 937.9 | n-butylcyclopentane | 0.0960 | 0.0913 | 0.0928 |
| 25.182 | 939.8 | 3,3-dimethyloctane | 0.0695 | 0.0702 | 0.0596 |
| 32.885 | 1184.7 | Isoparaffin 1182 | 0.0630 | 0.0624 | 0.0452 |

FIG. 8 A

Components Listed in Chromatographic Order

| RT, min. | Index | Component: | Mass% | Vol% | Mol% |
|---|---|---|---|---|---|
| 9.871 | 398.3 | 1,3-butadiene | 0.035 | 0.042 | 0.073 |
| 14.022 | 477.6 | i-pentane | 0.012 | 0.015 | 0.019 |
| 15.047 | 491.4 | pentene-1 | 0.017 | 0.019 | 0.026 |
| 15.538 | 497.5 | 2-methylbutene-1 | 0.045 | 0.051 | 0.071 |
| 15.816 | 501.1 | n-pentane | 0.028 | 0.033 | 0.043 |
| 16.180 | 507.1 | isoprene | 0.247 | 0.271 | 0.406 |
| 16.431 | 511.1 | t-pentene-2 | 0.016 | 0.018 | 0.025 |
| 17.329 | 524.6 | 2-methylbutene-2 | 0.226 | 0.256 | 0.362 |
| 17.552 | 528.0 | 1t,3-pentadiene | 0.020 | 0.022 | 0.032 |
| 18.292 | 538.2 | 2,2-dimethylbutane | 0.020 | 0.023 | 0.026 |
| 18.462 | 540.5 | 1c,3-pentadiene | 0.012 | 0.013 | 0.019 |
| 19.760 | 556.8 | cyclopentene | 0.038 | 0.036 | 0.062 |
| 20.118 | 561.0 | 3-methylpentene-1 | 0.021 | 0.024 | 0.028 |
| 20.614 | 566.7 | 2,3-dimethylbutane | 0.021 | 0.023 | 0.027 |
| 21.190 | 573.0 | 2-methylpentane | 0.051 | 0.059 | 0.067 |
| 21.374 | 575.0 | 4-methyl-t-pentene-2 | 0.042 | 0.047 | 0.058 |
| 22.402 | 585.6 | 3-methylpentane | 0.035 | 0.039 | 0.045 |
| 22.912 | 590.6 | 2-methylpentene-1 | 0.031 | 0.034 | 0.042 |
| 23.007 | 591.5 | hexene-1 | 0.102 | 0.113 | 0.136 |
| 23.988 | 600.9 | n-hexane | 0.154 | 0.175 | 0.201 |
| 24.501 | 605.4 | t-hexene-2 | 0.049 | 0.054 | 0.065 |
| 24.718 | 608.7 | O12 | 0.120 | 0.130 | 0.160 |
| 24.842 | 610.0 | 3-methyl-c-pentene-2 | 0.063 | 0.068 | 0.084 |
| 24.987 | 611.5 | 3-methylcyclopentene | 0.099 | 0.097 | 0.135 |
| 25.154 | 613.2 | O13 | 0.021 | 0.022 | 0.027 |
| 25.256 | 614.3 | c-hexene-2 | 0.028 | 0.031 | 0.038 |
| 25.982 | 621.5 | 3-methyl-t-pentene-2 | 0.205 | 0.218 | 0.273 |
| 26.167 | 623.3 | 4,4-dimethyl-t-pentene-2 | 0.023 | 0.024 | 0.026 |
| 26.550 | 627.0 | cyclic diolefin or triolefin | 0.142 | 0.150 | 0.193 |
| 26.944 | 630.7 | 2,4-dimethylpentane | 0.128 | 0.142 | 0.143 |
| 27.276 | 633.8 | O16 | 0.177 | 0.188 | 0.236 |
| 27.488 | 635.7 | 2,2,3-trimethylbutane | 0.208 | 0.226 | 0.233 |
| 27.661 | 637.3 | O17 | 0.217 | 0.231 | 0.289 |
| 27.925 | 639.7 | cyclic diolefin or triolefin | 0.160 | 0.169 | 0.219 |
| 28.370 | 643.6 | 3,4-dimethylpentene-1 | 0.131 | 0.140 | 0.150 |
| 28.752 | 646.9 | 4,4-dimethyl-c-pentene-2 | 0.110 | 0.117 | 0.126 |
| 28.966 | 648.8 | diolefin | 0.235 | 0.252 | 0.321 |
| 29.064 | 649.6 | 1-methylcyclopentene | 0.464 | 0.446 | 0.634 |

FIG. 8 B

| RT, min. | Index | Component: | Mass% | Vol% | Mol% |
|---|---|---|---|---|---|
| 29.362 | 652.1 | benzene | 2.150 | 1.833 | 3.089 |
| 29.770 | 655.5 | 2-methyl-c-hexene-3 | 0.471 | 0.506 | 0.539 |
| 29.985 | 657.3 | 5-methylhexene-1 | 0.054 | 0.058 | 0.062 |
| 30.199 | 659.0 | cyclohexane | 0.110 | 0.106 | 0.146 |
| 30.645 | 662.6 | 2-ethyl-3-methylbutene-1 | 0.080 | 0.084 | 0.091 |
| 30.750 | 663.4 | 4-methylhexene-1 | 0.106 | 0.112 | 0.121 |
| 30.855 | 664.2 | 4-methyl-t/c-hexene-2 | 0.120 | 0.128 | 0.137 |
| 31.265 | 667.4 | 2-methylhexane | 0.108 | 0.120 | 0.121 |
| 31.456 | 668.9 | 2,3-dimethylpentane | 0.055 | 0.059 | 0.061 |
| 31.900 | 672.3 | 1,1-dimethylcyclopentane | 0.027 | 0.027 | 0.031 |
| 32.280 | 675.1 | 3-methylhexane | 0.501 | 0.547 | 0.561 |
| 33.276 | 682.4 | 1c,3-dimethylcyclopentane | 0.048 | 0.048 | 0.055 |
| 33.664 | 685.2 | 1t,3-dimethylcyclopentane | 0.055 | 0.055 | 0.063 |
| 33.849 | 686.5 | 3-ethylpentane | 0.099 | 0.106 | 0.111 |
| 34.049 | 687.9 | 1t,2-dimethylcyclopentane | 0.193 | 0.193 | 0.221 |
| 34.223 | 689.1 | 2,2,4-trimethylpentane | 0.737 | 0.798 | 0.724 |
| 35.128 | 695.3 | 3-methyl-c-hexene-3 | 0.067 | 0.070 | 0.077 |
| 35.628 | 698.6 | t-heptene-3 | 0.089 | 0.095 | 0.102 |
| 35.843 | 700.0 | n-heptane | 1.344 | 1.473 | 1.505 |
| 35.998 | 700.9 | c-heptene-3 | 0.166 | 0.177 | 0.189 |
| 36.211 | 702.2 | 3-methyl-c-hexene-2 | 0.204 | 0.215 | 0.234 |
| 36.404 | 703.4 | 3-methyl-t-hexene-3 | 0.085 | 0.092 | 0.098 |
| 36.670 | 704.9 | t-heptene-2 | 0.109 | 0.115 | 0.124 |
| 36.949 | 706.6 | 3-ethylpentene-2 | 0.031 | 0.033 | 0.036 |
| 37.501 | 709.8 | c-heptene-2 | 1.532 | 1.613 | 1.750 |
| 38.346 | 714.6 | O28 | 0.084 | 0.086 | 0.096 |
| 38.765 | 716.8 | O29 | 0.096 | 0.098 | 0.096 |
| 38.908 | 717.6 | 1c,2-dimethylcyclopentane | 0.052 | 0.053 | 0.060 |
| 39.183 | 719.1 | methylcyclohexane | 0.522 | 0.508 | 0.596 |
| 39.438 | 720.5 | 2,2-dimethylhexane | 0.077 | 0.083 | 0.076 |
| 39.643 | 721.6 | 1,1,3-trimethylcyclopentane | 0.077 | 0.077 | 0.077 |
| 40.008 | 723.6 | O30 | 0.296 | 0.302 | 0.295 |
| 40.558 | 726.5 | O32 | 0.652 | 0.667 | 0.745 |
| 40.895 | 728.2 | ethylcyclopentane | 0.060 | 0.059 | 0.069 |
| 41.290 | 730.2 | 2,5-dimethylhexane | 0.251 | 0.271 | 0.247 |
| 41.829 | 733.0 | O33 | 0.181 | 0.186 | 0.207 |
| 42.210 | 734.9 | O34 | 0.162 | 0.166 | 0.185 |
| 42.580 | 736.7 | 1c,2t,4-trimethylcyclopentane | 0.077 | 0.076 | 0.077 |
| 42.868 | 738.2 | 3,3-dimethylhexane | 0.120 | 0.126 | 0.117 |
| 43.066 | 739.1 | O35 | 0.108 | 0.111 | 0.123 |
| 43.697 | 742.1 | O36 | 0.311 | 0.318 | 0.355 |
| 44.402 | 745.5 | O38 | 0.307 | 0.314 | 0.351 |
| 44.554 | 746.2 | 2,3,4-trimethylpentane | 0.064 | 0.067 | 0.063 |
| 45.255 | 749.4 | O39 | 1.877 | 1.921 | 1.876 |
| 45.583 | 750.9 | 2,3,3-trimethylpentane | 0.270 | 0.279 | 0.265 |
| 46.320 | 754.3 | toluene | 7.348 | 6.351 | 8.948 |
| 46.912 | 756.9 | 2,3-dimethylhexane | 0.590 | 0.621 | 0.580 |
| 47.407 | 759.0 | 2-methyl-3-ethylpentane | 0.193 | 0.203 | 0.189 |
| 47.697 | 760.3 | 1,1,2-trimethylcyclopentane | 0.268 | 0.260 | 0.268 |
| 48.046 | 761.8 | O44 | 0.414 | 0.424 | 0.414 |
| 48.523 | 763.8 | *2-ethylhexene-1 | 0.475 | 0.465 | 0.475 |
| 48.868 | 765.3 | 2-methylheptane | 1.463 | 1.571 | 1.437 |
| 49.240 | 766.9 | 3-methyl-3-ethylpentane | 0.328 | 0.345 | 0.322 |

FIG. 8C

| RT, min. | Index | Component: | Mass% | Vol% | Mol% |
|---|---|---|---|---|---|
| 50.101 | 770.4 | 1c,2c,4-trimethylcyclopentane | 0.640 | 0.630 | 0.640 |
| 50.784 | 773.2 | 1c,2t,3-trimethylcyclopentane | 1.045 | 1.017 | 1.045 |
| 51.298 | 775.2 | 1t,4-dimethylcyclohexane | 10.557 | 10.375 | 10.556 |
| 51.757 | 777.0 | 1,3-octadiene | 3.098 | 3.035 | 3.154 |
| 52.690 | 780.7 | 1,1-dimethylcyclohexane | 0.113 | 0.108 | 0.112 |
| 53.262 | 782.9 | 2,2,5-trimethylhexane | 0.451 | 0.477 | 0.394 |
| 53.841 | 785.1 | 2,6-dimethylheptene-1 | 0.114 | 0.119 | 0.102 |
| 54.217 | 786.5 | octene-1 | 0.471 | 0.462 | 0.471 |
| 54.832 | 788.8 | 2,2,4-trimethylhexane | 0.495 | 0.502 | 0.433 |
| 55.200 | 790.1 | 1,1-methylethylcyclopentane | 1.279 | 1.228 | 1.279 |
| 56.672 | 795.4 | 3,5,5-trimethylhexene-1 | 5.533 | 5.782 | 4.918 |
| 58.557 | 802.4 | n-octane | 7.770 | 8.288 | 7.632 |
| 58.945 | 804.0 | 3,3-dimethylheptene-1 | 4.770 | 4.967 | 4.240 |
| 60.549 | 810.5 | O50 | 0.193 | 0.201 | 0.172 |
| 61.148 | 812.9 | c-octene-2 | 0.525 | 0.546 | 0.466 |
| 63.194 | 820.8 | O52 | 0.252 | 0.262 | 0.224 |
| 63.994 | 823.8 | 2,3,3-trimethylhexene-1 | 0.129 | 0.141 | 0.114 |
| 64.768 | 826.7 | O53 | 0.144 | 0.150 | 0.128 |
| 65.373 | 829.0 | 2,2-dimethylheptane | 0.115 | 0.121 | 0.101 |
| 66.940 | 834.6 | 2,3,5-trimethylhexane | 2.434 | 2.527 | 2.130 |
| 67.486 | 836.6 | 2,4-dimethylheptane | 0.641 | 0.672 | 0.561 |
| 68.821 | 841.2 | 1,1,4-trimethylcyclohexane | 8.088 | 7.849 | 7.189 |
| 69.252 | 842.7 | n-propylcyclopentane | 2.264 | 2.185 | 2.264 |
| 69.838 | 844.7 | 4,4-dimethylheptane | 0.198 | 0.208 | 0.173 |
| 70.538 | 847.1 | 1,1,3-trimethylcyclohexane | 3.330 | 3.171 | 2.960 |
| 71.402 | 850.0 | N7 | 1.559 | 1.497 | 1.559 |
| 71.853 | 851.5 | N8 | 0.223 | 0.214 | 0.222 |
| 73.517 | 856.9 | 1c,2t,4t-trimethylcyclohexane | 0.050 | 0.048 | 0.045 |
| 74.760 | 860.9 | N12 | 0.555 | 0.534 | 0.494 |
| 75.011 | 861.7 | N13 | 0.253 | 0.243 | 0.225 |
| 76.437 | 866.1 | 1,3-dimethylbenzene | 0.401 | 0.348 | 0.424 |
| 77.592 | 869.7 | 2,3-dimethylheptane | 2.421 | 2.499 | 2.118 |
| 78.162 | 871.4 | 3,4-dimethylheptane | 0.129 | 0.133 | 0.113 |
| 78.379 | 872.0 | 4-ethylheptane | 0.147 | 0.153 | 0.129 |
| 79.275 | 874.7 | 4-methyloctane | 0.121 | 0.126 | 0.106 |
| 79.879 | 876.5 | 2-methyloctane | 1.208 | 1.259 | 1.057 |
| 80.160 | 877.3 | 1c,2t,3-trimethylcyclohexane | 1.401 | 1.385 | 1.245 |
| 80.853 | 879.3 | 3-ethylheptane | 0.252 | 0.260 | 0.220 |
| 81.528 | 881.3 | 3-methyloctane | 0.888 | 0.923 | 0.777 |
| 81.902 | 882.4 | 1,1,2-trimethylcyclohexane | 2.210 | 2.070 | 1.964 |
| 82.364 | 883.7 | I6 | 0.522 | 0.536 | 0.457 |
| 83.148 | 885.9 | 1,2-dimethylbenzene | 0.105 | 0.090 | 0.111 |
| 83.454 | 886.8 | I7 | 0.356 | 0.365 | 0.311 |
| 84.643 | 890.1 | N20 | 0.483 | 0.464 | 0.430 |
| 84.862 | 890.8 | I8 | 0.817 | 0.839 | 0.715 |
| 85.405 | 892.2 | I9 | 0.388 | 0.398 | 0.339 |
| 86.080 | 894.0 | N21 | 0.097 | 0.093 | 0.086 |
| 88.310 | 900.0 | n-nonane | 0.062 | 0.065 | 0.055 |
| 88.703 | 902.2 | 3,7-dimethyloctene-1 | 1.170 | 1.250 | 0.938 |
| 89.274 | 905.4 | N25 | 0.223 | 0.211 | 0.198 |
| 91.603 | 918.2 | i-propylcyclohexane | 0.093 | 0.087 | 0.083 |
| 94.316 | 932.6 | 2,6-dimethyloctane | 0.041 | 0.042 | 0.032 |
| 111.362 | 1024.5 | I30 | 0.159 | 0.161 | 0.114 |

HYDROCARBON SYNTHESIZER

RELATED APPLICATIONS

This application claims priority under 35 U.S.C. §119(e) to U.S. Provisional Application Ser. No. 61/244,797, titled "Hydrocarbon Synthesizer," filed on Sep. 22, 2009 which is incorporated herein, by reference, in its entirety.

BACKGROUND

The invention relates to the formation of hydrocarbon fractions from petroleum and non-petroleum feedstocks.

As is known to those skilled in the art of petroleum recovery and refining, crude oil is a complex mixture of hydrocarbons that varies in composition depending upon its source. It is widely accepted that crude oil has its origin in plant and animal matter that has been subjected to heat and pressure for millions of years. For most industrial uses, a portion of the crude oil having similar boiling points and viscosity is used, rather than a particular chemical species from the crude. The portions of crude oil separated by boiling point are known as fractions, and the process of separation is known as fractionation. Hydrocarbon fractions, and hydrocarbon fractionation, are well known in the field of petroleum refining.

In simplest form, fractionation involves the selective distillation of petroleum crude into its component parts based upon the boiling temperature of those components parts. Definitions of the fractions vary amongst producers, however one definition is:

| Fraction | Boiling Range (° C.) | Number of Carbon Atoms |
|---|---|---|
| natural gas | <20 | $C_1$ to $C_4$ |
| petroleum ether | 20-60 | $C_5$ to $C_6$ |
| Gasoline | 40-200 | $C_5$ to $C_{12}$, but mostly $C_6$ to $C_8$ |
| Kerosene | 150-260 | mostly $C_{12}$ to $C_{13}$ |
| fuel oils | >260 | $C_{14}$ and higher |
| Lubricants | >400 | $C_{20}$ and above |
| asphalt or coke | residue | polycyclic |

See, J. G. Speight, *The Chemistry and Technology of Petroleum* (2007). Each fraction has its own utility, however some fractions are more valuable than others. For example the gasoline fraction may sell for $2.00/gal wholesale while fuel oil sells for $1.50/gal wholesale. Currently, the gasoline fraction is most valuable, however increasing worldwide demand for aviation and diesel fuel makes the kerosene fraction nearly as valuable as the gasoline fraction.

The value spread between the various fractions drives the petroleum refining industry. Various techniques are known to those of ordinary skill in the art for converting low value fractions to higher value fractions. These techniques may include cracking, hydrogenation, and reforming, among others. Cracking refers to breaking long carbon-chain petroleum molecules into shorter carbon-chain molecules. Hydrogenation refers to the addition of molecular hydrogen across one or more carbon-carbon double bonds to produce higher value products. For example, benzene may be hydrogenated to cyclohexane. Reforming refers, generally, to processes that produce higher-value, branched hydrocarbons, such as iso-paraffins, from lower value hydrocarbons, such as straight-chain paraffins. Reforming processes can include both cracking and hydrogenation processes.

The petroleum industry relies heavily on catalysts to decrease the temperatures and pressures needed to drive various conversion processes. Catalysts useful in the industry include palladium, platinum, nickel, cobalt, tungsten, iron, and alloys containing these metals. For some processes, catalysts allow a substantial reduction in thermal energy requirements, thereby saving natural gas and electricity costs. However, the catalysts are typically quite expensive, and most lose their effectiveness over time. Once a catalyst has lost its effectiveness, it must be reconditioned or replaced. In many cases, recharging a catalyst results in lost productivity for the conversion process.

BRIEF DESCRIPTION OF THE DRAWINGS

FIG. 6 A-D shows a table of the chemical composition of a fraction of hydrocarbon products synthesized from used motor oil.

FIG. 7 A-B shows a table of the chemical composition of a fraction of hydrocarbon products synthesized from refined soybean oil.

FIG. 8 A-C shows a table of the chemical composition of a fraction of hydrocarbon products synthesized from pyrolysis oil of used tires.

DETAILED DESCRIPTION

Figure 1:
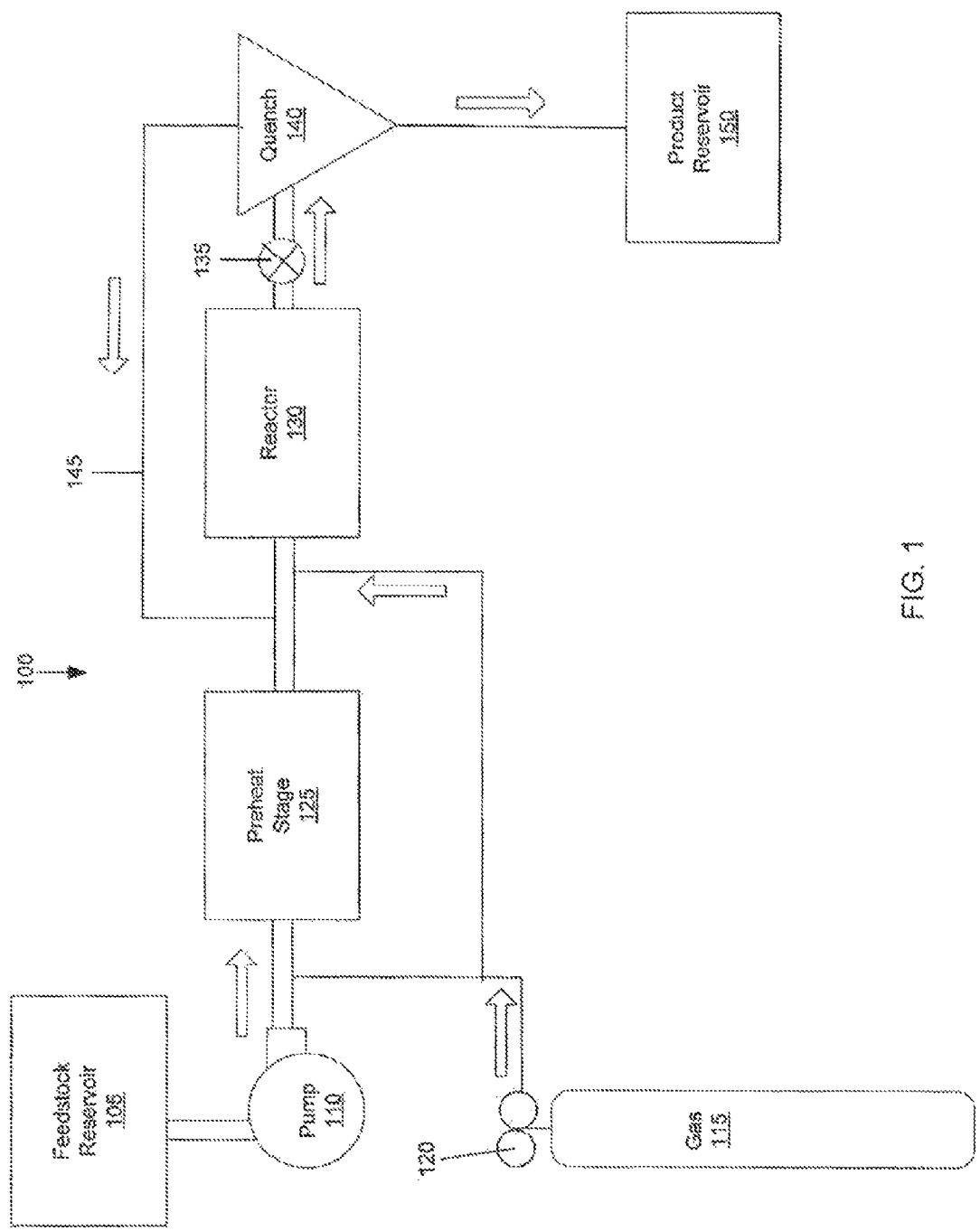
FIG. 1 shows an embodiment of a hydrocarbon synthesizer of the invention.

The invention has the ability to convert many different feedstocks into high value hydrocarbon products, including, but not limited to gasoline, diesel, aviation fuel, propane, fuel oil, lubricants, and asphalts. Furthermore, it is not necessary to use catalytic materials.

In one embodiment, a hydrocarbon synthesizer comprising a feedstock reservoir, a feedstock pump, a high-pressure gas injector, a feedstock preheat vessel, a reactor with an entrance and an exit, having a flow restricting orifice at or near the entrance, a product quench vessel, and a product recovery reservoir. The feedstock reservoir, feedstock pump, high-pressure gas injector, feedstock preheat vessel, flow-restricting orifice, reactor, product quench vessel, and product recovery reservoir are operatively connected to each other. A feedstock may be preheated in the feedstock preheat vessel, and expanded through a flow-restricting orifice with a high-pressure gas to produce a product from the heated feedstock, the product being quenched in the product quench vessel and then collected in the product recovery reservoir. The hydrocarbon synthesizer may additionally comprise components suitable to divide the product into hydrocarbon fractions.

In another embodiment a hydrocarbon synthesizer system comprising a hydrocarbon feedstock source, a gas source, a preheat vessel, (fluidly-connected downstream from the hydrocarbon feedstock source, constructed and arranged to heat the hydrocarbon feedstock), an injector (fluidly-connected downstream from the gas source, constructed and arranged to mix the gas with the hydrocarbon feedstock to create a mixture), a reactor having a flow-restricting orifice proximate to an inlet (the inlet fluidly-connected downstream from the preheat vessel and the injector, constructed and arranged to expand the mixture through the flow-restricting orifice at a temperature and a pressure sufficient to crack hydrocarbons in the mixture to create hydrocarbon intermediates), and a quench vessel (fluidly-connected downstream from the outlet of the reactor, constructed and arranged to cool the hydrocarbon intermediates to form hydrocarbon products).

In another embodiment a method of synthesizing hydrocarbons from a feedstock, comprising injecting hydrogen gas into a feedstock to create a hydrogen-feedstock mixture, heating the hydrogen-feedstock mixture to create a hot hydrogen-feedstock mixture, expanding the hot hydrogen-feedstock mixture through a flow-restricting orifice into a reaction chamber to create hydrocarbon products, quenching the hydrocarbon products to form hydrocarbon fractions, and recovering the hydrocarbon fractions. In some embodiments, the hydrocarbon synthesizer may be optimized to produce a petroleum fraction suitable for sale as gasoline. Other embodiments may allow the separation and recovery of the gasoline fraction.

In another embodiment a method of synthesizing hydrocarbon products from a hydrocarbon feedstock, comprising mixing hydrogen gas with a hydrocarbon feedstock to create a mixture, heating the mixture, expanding the mixture through a flow-restricting orifice at a temperature and pressure sufficient to crack hydrocarbons in the mixture to create hydrocarbon intermediates, and quenching the hydrocarbon intermediates to form hydrocarbon products.

As used herein, the term "hydrocarbon" refers to any molecule consisting of carbon and hydrogen in any combination. As such, "hydrocarbon" includes straight-chain, branched, and cyclic alkanes, alkenes, alkynes, and aromatics.

The invention, utilizing the below-identified conditions of temperature, pressure, and reaction time allows for the creation of a wide range of hydrocarbon products via the quenching of hydrocarbon intermediates. The intermediates are formed by cracking hydrocarbons in the feedstock. Hydrocarbon intermediates may include small chain (e.g., $C_1$-$C_5$ hydrocarbon molecules and hydrocarbon radicals. During quenching, the intermediates may be oligomerized, hydrogenated, and/or reformed to produce hydrocarbon products. The hydrocarbon products may be a mixture of hydrocarbon components (fractions). The mixture of hydrocarbon components may be separated via fractionation processes known in the art.

Using the methods of the invention it is possible to shift the "peak" of the fractions to some degree by varying the temperature, pressure, and the time of reaction. For example, shorter reaction times favor lighter products, such as propanes and paraffins, while longer reaction times result in more kerosene-weight hydrocarbons. In particular, by controlling the pressure, temperature, and reaction time it is possible to predominantly form a gasoline fraction. It is also possible to predominantly form a kerosene fraction.

The methods and systems of the present invention enable the efficient production of liquid hydrocarbon fuels from a number of feedstocks. Hydrocarbon fuels created by the present invention may include, but need not be limited to gasoline, diesel, kerosene, jet/aviation fuel, and light heating oils, wherein these fuels meet the various standards set out by ASTM International and the United States Environmental Protection Agency (U.S. E.P.A.).

The mixture of hydrocarbons produced by the invention may be independently valuable as a petroleum crude equivalent that is enriched in middle-weight distillates. In some cases, e.g., where the feedstock is biomass or vegetable oil, the hydrocarbon mixture of the invention lacks many contaminants, such as sulfur and heavy metals. To this end, the hydrocarbon mixture may be added to the traditional petroleum crude stream, processed in traditional refineries to dilute contaminants that would otherwise result in non-compliant fuels.

Figure 3:
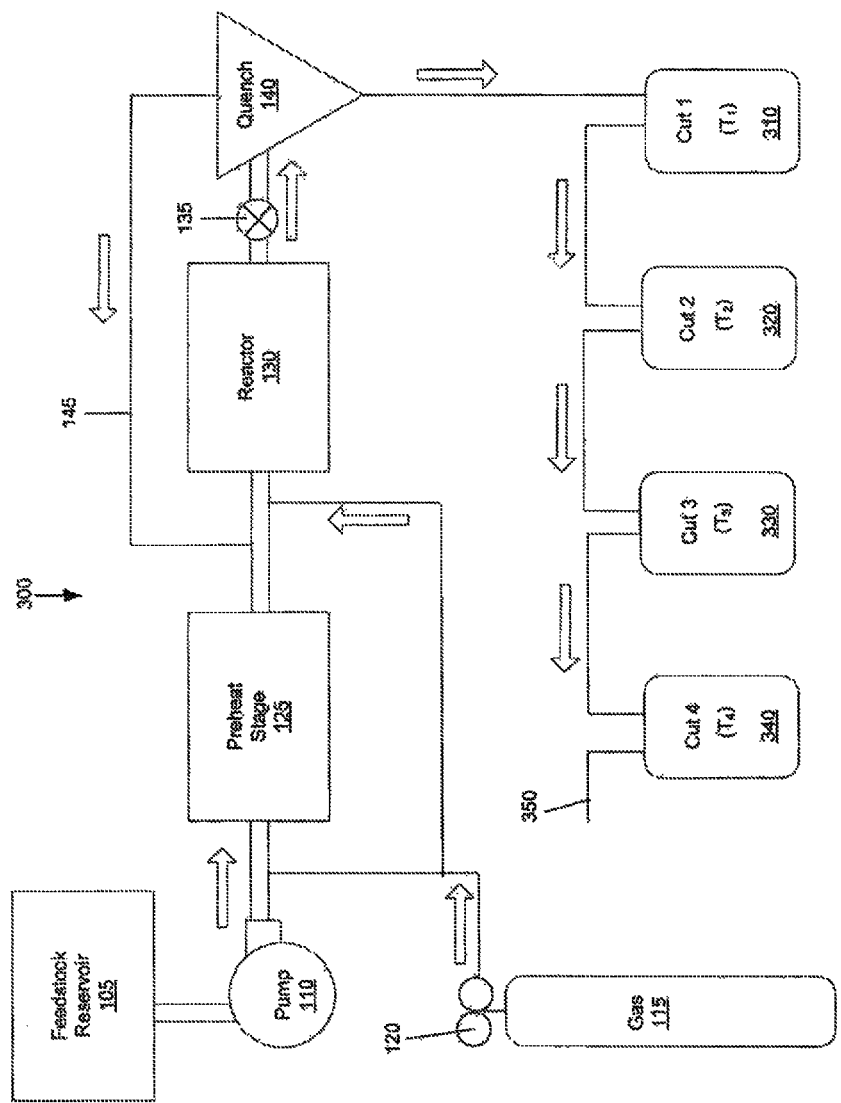
FIG. 3 shows an embodiment of a hydrocarbon synthesizer of the invention.
Figure 5:
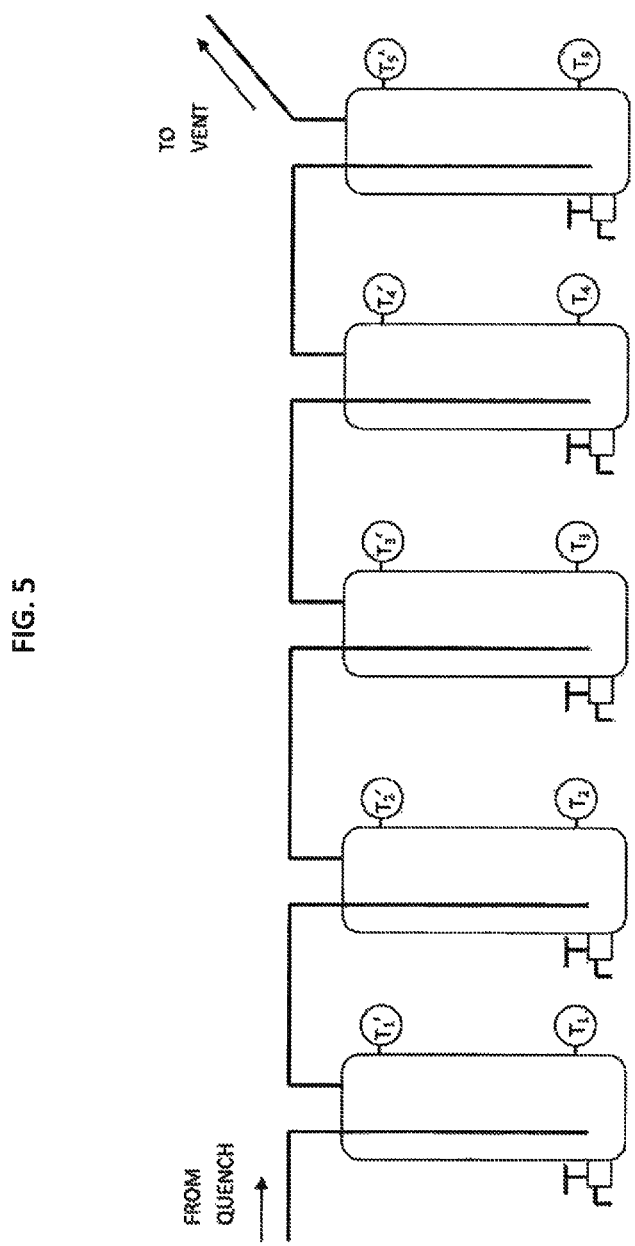
FIG. 5 shows an embodiment of reboilers suitable for use with the invention.

Furthermore, as is described in FIGS. 3 and 5, it is also possible to separate higher value products from the hydrocarbon mixtures at the point of creation. Because of the small footprint of the invention, the invention may be mass-produced, making possible distributed hydrocarbon production closer to the source of various feedstocks.

The systems and methods of the present invention additionally allow for the production of organic chemicals such as olefins, paraffins, aromatics, and naphthenes. Of particular value are chemicals that may be used as feedstocks to the petrochemical industry such as ethylene, acetylene, benzene, cyclohexane, xylene, toluene, ethylbenzene, and other precursor molecules. By varying the temperature, pressure, and time of the oligomerization reaction, it may be possible to optionally produce a greater portion of a fuel or chemical feedstock depending upon the market price for a given fuel or feedstock chemical.

The invention is capable of converting a variety of feedstocks into a mixture of hydrocarbon products that are chemically-identical to those produced from crude oil. Feedstocks suitable for conversion with the invention must be fluid organics, e.g., containing carbon, however the feedstocks may originate in biomass, petroleum, or other post-consumer products. Feedstocks suitable for the invention may include, but need not be limited to crude oil, petroleum, residuum, tar, natural gas, landfill gas, digester gas, used motor oil, plant oil, vegetable oil, vegetable fats, animal fats, grease, petroleum-based hazardous waste, and plastics.

The invention need not be limited to hydrocarbon feedstocks, however, as oxygen and nitrogen-containing organics may also be converted into petroleum fractions. For example, the systems and methods of the invention may be used to convert plant oils to mixed hydrocarbons. When oxygen- or nitrogen-containing feedstocks are used, the oxygen and nitrogen is converted to water and amines which result in an aqueous fraction that may be released as vapor, or may be separated from the hydrocarbon products by allowing the hydrocarbon products to settle for some time and then drawing off the aqueous layer.

It is additionally possible to create fluid organic feedstocks suitable for use with systems and methods of the invention from biomass by using known pyrolysis techniques. To create a pyrolysis oil suitable for use as a feedstock, biomass is collected and dried. Once dried, the biomass is typically processed (e.g. pulverized, micronized) to reduce the size. The processed biomass is then injected into a pyrolysis reactor where the residual biomass is broken down at high temperatures (e.g., at about 500° C.) in the absence of oxygen to form a pyrolysis oil ("pyoil" or "pyro-oil"). The resultant pyrolysis oil comprises a mixture of long chain hydrocarbons. In addition to being used as a feedstock, the pyrolysis oil may be burned to provide thermal energy (heat) for the preheat vessel, reactor, or separation stages (described below). Pyrolysis reactors suitable to be used as subsystems for the present invention may be obtained from Dynamotive Energy Systems (McLean, Va.).

Biomass suitable for conversion to pyrolysis oil for use with the invention includes, but need not be limited to, animal manures, kitchen waste, food processing waste, beverage waste, thin and whole stillage, wet distillers grain, raw human sewage, municipal solid waste, treated sewage sludges, fats, oils, greases, meat packing waste, paunche, tallows, processed lignocellulosic waste, pulp and paper sludges, wood wastes, landfill gas, digester gas, energy crops (cane, sorghum, miscanthus, switch grass), timber (poplar, aspen, willow, alder), crop residues (corn stover, wheat or rice straw, palm), algae, diatoms, seaweed, and other discarded vegetation including municipal grass and timber wastes.

Pyrolysis oil may also be produced from petroleum products and petroleum by-products. Petroleum products and by-products may include plastics, wastes, tires, paints, solvents, or industrial chemicals with an expired shelf-life. Pyrolysis oil that originates in petroleum products does not contain as many nitrogen and oxygen compounds as pyrolysis oil originating in biomass, so the resulting hydrocarbon products do not contain any aqueous or amine components. Additionally, it is rarely necessary to dry the feedstock prior to pyrolysis. For example, used tires may be pyrolyzed to produce an oil that can be used as a feedstock for the invention.

Most broadly, the methods of the invention comprise the high-pressure expansion of a hot fluid (i.e., gas or liquid) feedstock through a flow-restricting orifice, and the subsequent quenching of the products produced by the high-pressure expansion. A hydrocarbon synthesizer 100 of the invention, capable of synthesizing mixed hydrocarbon products from feedstocks is shown in FIG. 1.

As described herein, a hydrocarbon synthesizer system comprises at least a hydrocarbon feedstock source, a gas source, a preheat vessel, an injector, a reactor, and a quench vessel. The preheat vessel is fluidly-connected downstream from the hydrocarbon feedstock source, constructed and arranged to heat the hydrocarbon feedstock. The injector is fluidly-connected downstream from the gas source, constructed and arranged to mix the gas with the hydrocarbon feedstock to create a mixture. The reactor has a flow-restricting orifice proximate to an inlet, wherein the inlet is fluidly-connected downstream from the preheat vessel and the injector, and the reactor is constructed and arranged to expand the mixture through the flow-restricting orifice at a temperature and a pressure sufficient to crack hydrocarbons in the mixture to create hydrocarbon intermediates. The quench vessel is fluidly-connected downstream from the outlet of the reactor, constructed and arranged to cool the hydrocarbon intermediates to form hydrocarbon products.

In one embodiment, a fluid feedstock is pumped from feedstock reservoir (source) 105 into hydrocarbon synthesizer 100 with pump 110. Once pumped into the system, the feedstock is combined with high-pressure gas from cylinder 115. The pressure of the high-pressure gas may be regulated with regulator 120. The fluid feedstock then passes to feedstock preheat vessel 125 where the temperature of the fluid feedstock is heated to a temperature greater than about 500° F., typically greater than about 700° F., more typically greater than about 900° F. After heating, the fluid feedstock may be optionally combined with additional high-pressure gas, prior to being fed into the reactor 130.

Preheat vessel 125 may comprise any heat-exchanger suitable for the temperatures and pressures described herein. For example, the preheat vessel may be a radiator, or finned or coiled structure with a high surface area to volume ratio in the presence of a heat source, such as electric radiant heat, geothermal heat, or combustion heat. In one embodiment, the preheat comprises multiple loops of stainless steel tubing contained within an insulated, heated chamber. For example, preheat vessel 125 may comprise 100' of coiled ¼" 316 L stainless steel within a pottery kiln. Feedstock preheat vessel may also comprise a stainless steel heat-exchanger heated by an open flame, such as a natural gas-fired burner. In some embodiments, a propane cut from the lowest temperature reboiler may be used to heat the feedstock. The heat transfer medium of feedstock preheat vessel 125 is not limited to air, however, as superheated steam or molten salts may also be used to heat the feedstock to temperatures sufficient for hydrocarbon synthesis according to the invention.

Figure 2:
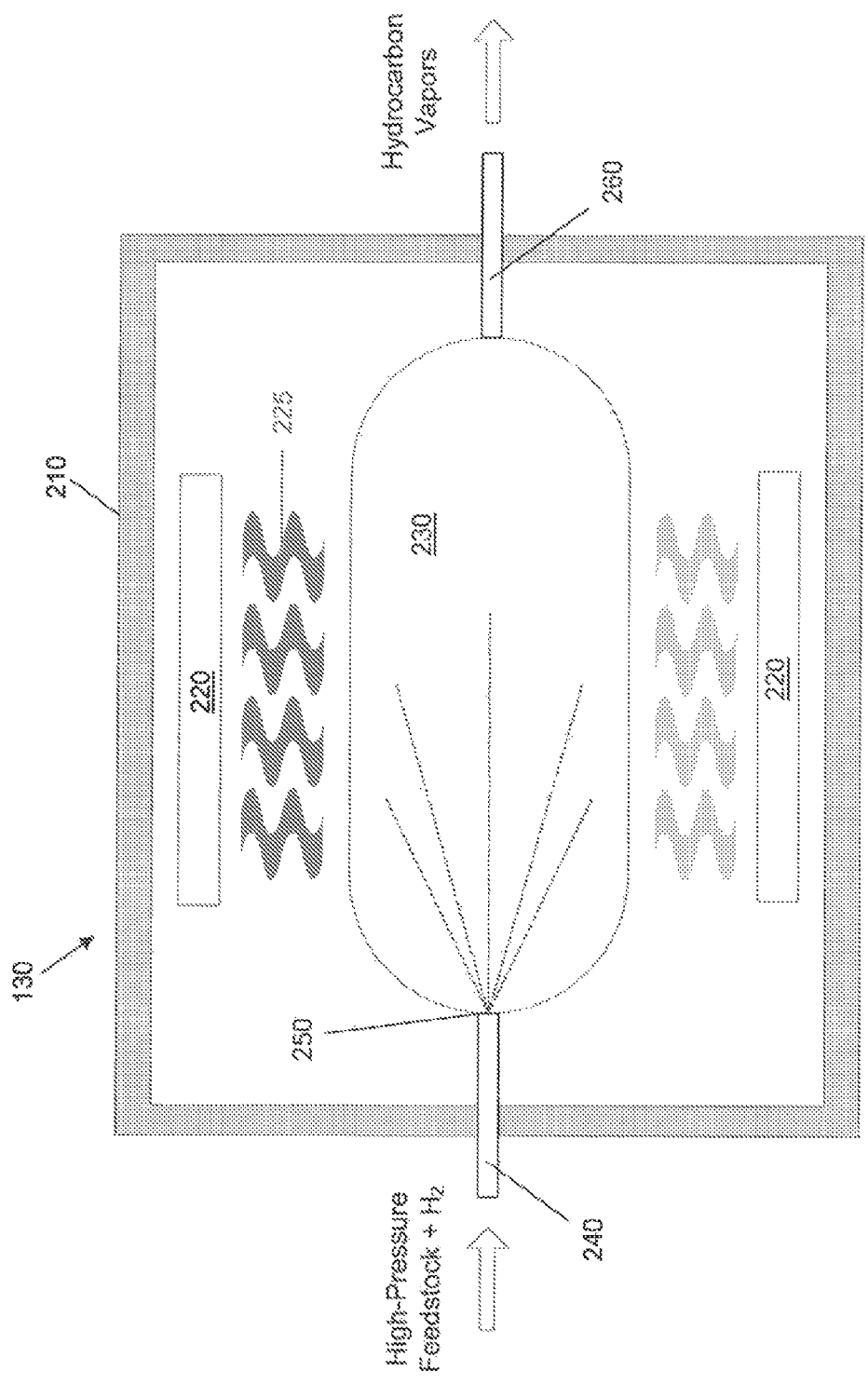
FIG. 2 shows an embodiment of a reactor suitable for a hydrocarbon synthesizer of the invention

The reactor 130 is more clearly shown in FIG. 2. In one embodiment, reactor 130 comprises insulated container 210, containing heating elements 220 capable of adding thermal energy 225 to allow for maintaining expansion vessel 230 at the desired temperature. Reactor 130 may also be heated by an open flame, such as a natural gas-fired burner. In some embodiments, a propane cut from the lowest temperature reboiler may be used to heat the feedstock. (See FIG. 4.) As shown in FIG. 2, a feedstock and gas mixture enters reactor 130 via entrance line 240 whereupon the feedstock passes through a flow-restricting orifice 250 into expansion vessel 230. The flow-restricting orifice may comprise a specialty fitting having a small hole and capable of coupling between the entrance line 240 and expansion vessel 230. Flow-restricting orifice 250 may alternatively comprise a small metal plate with a hole secured between entrance line 240 and expansion vessel 230. The opening of the flow-restricting orifice 250 is smaller than about ⅛" (3 mm) in diameter, typically smaller than about 1/16" (2 mm) in diameter, more typically smaller than about 1/32" (1 mm) in diameter. Because of the temperatures and pressure, flow-restricting orifice 250 is typically constructed of stainless steel, however other materials may be suitable for construction of flow-restricting orifice 250. Flow-restricting orifices suitable for use with the invention are produced by Swagelok (Peoria Fluid System Technologies, Morton, Ill.). The geometric arrangement of the expansion vessel is not critical as long as the mixture, once cracked to produce hydrocarbon intermediates, has sufficient time to hydrogenate and reform prior to encountering the quench region.

The hydrocarbon intermediates and products from the reaction leave expansion vessel 230 via exit line 260 because of the pressure differential between entrance line 240 and exit line 260. The expansion vessel 230 is typically constructed of stainless steel, however other materials may be suitable for construction of expansion vessel 230. In some embodiments expansion vessel 230 is an elongated cylinder with an outer diameter of about 4", although other configurations are suitable for use with the invention.

As the fluid feedstock is fed through the flow-restricting orifice 250 it expands into the expansion vessel 230. The pressure inside reactor 130 is lower than the backing pressure (prior to reactor 130) in order to obtain a suitable expansion. Prior to reactor 130, the backing pressure is greater than about 80 PSIG, typically greater than 100 PSIG, more typically greater than about 120 PSIG, more typically greater than about 150 PSIG, or greater than 200 PSIG. The temperature of reactor 130 in which the expansion takes place is greater than about 500° F., typically greater than 800° F., more typically greater than about 900° F., more typically greater than about 1200° F. The pressure inside reactor 130 can be controlled with valve 135 after the exit from reactor 130. The pressure inside reactor 130 is greater than about 60 PSIG, typically greater than about 80 PSIG, more typically greater than about 100 PSIG.

Upon exiting reactor 130, the intermediates produced by the high-pressure expansion are quenched in product quench vessel 140 to produce a mixture of hydrocarbon products. Product quench vessel 140 may be a simple condensation reservoir capable of withstanding 200 PSIG, with a cooling jacket around the condensation reservoir. The cooling media used in the cooling jacket may include, but is not limited to, naphtha, paraffins, and water. In some embodiments a naphtha cut from the reboilers may be directly recycled into product quench vessel 140. (See FIG. 4.) The products are quenched at a temperature less than 600° F., typically less than 400° F., more typically less than 300° F. Optionally, a recirculation loop line 145 may be used to recirculate a portion of the hydrocarbon products from product quench vessel 140 to entrance line 240 of reactor 130. Recirculation loop line 145 may simply comprise a section of ¼" stainless steel tubing connecting product quench vessel 140 to entrance line 240 prior to flow-restricting orifice 250. It may be additionally necessary to include a compressor (not shown) and a backflow valve (not shown) to push the recirculated hydrocarbon products into the stream of preheated feedstock and high-pressure gas prior to the reactor.

Pressure gauges and valves are placed throughout hydrocarbon synthesizer 100 to allow for monitoring and controlling the pressure. Additionally, temperature sensors are located throughout the hydrocarbon synthesizer 100 to allow for monitoring the temperature. In some embodiments, the hydrocarbon mixture may be recovered in product recovery reservoir 150. In other embodiments, the hydrocarbon synthesizer 100 may additionally comprise fractionation equipment, thereby allowing for the direct production of certain petroleum fractions (see FIG. 3). In advanced embodiments, pressure valves and thermocouples may be interfaced with electronic controls capable of regulating valves and heaters within the system. Such advanced embodiments allow greater control of the fractions which are created during the cracking process. Additionally, the electronic controls may open relief valves or terminate heating steps to avoid run-away processes which could lead to an explosion.

The materials of the invention must be robust to accommodate the high pressures and temperatures of the invention. In particular, tubing, fittings, valves, regulators, and welds must be able to withstand pressures in excess of 200 PSIG. Additionally, certain portions of hydrocarbon synthesizer 100 must be able to withstand temperatures in excess of 1400° F. Materials suitable for incorporation into hydrocarbon synthesizer 100 include, but are not limited to, 316 L stainless steel and MONEL stainless steels.

Preheat vessel 125 and reactor 130 may be heated with a variety of known techniques. For smaller embodiments, the temperature of feedstock preheat vessel 125 and reactor 130 may be suitably maintained with radiant electric heating. Electricity for the radiant heating may be obtained from the local electrical grid, or from another source, e.g., a wind turbine. In other embodiments, the temperature of feedstock preheat vessel 125 and reactor 130 may be suitably maintained with combustion burners. Combustion burners may burn natural gas, landfill gas, digester gas or biomass to produce the necessary heat. Combustion burners may also burn pyrolysis oil, as discussed above. Feedstock preheat vessel 125 and 130 need not be housed separately and may be combined into a single apparatus to reduce the need for separate heating elements. For example feedstock preheat vessel 125 may be located around or near reactor 130 but within the same insulated heating vessel.

Feedstock reservoirs (sources) 105 suitable for the invention may comprise any of a number of containers, including cylinders, tanks, barrels, and drums. Feedstock reservoirs 105 suitable for the invention may be obtained from any industrial supply company, although larger reservoirs may need to be constructed on-site. The shape and size of feedstock reservoir 105 is not determinative, as long as feedstock reservoir 105 material does not react with the feedstock and the feedstock reservoir 105 can withstand the pressure needed for the invention. Reservoir 105 may have one or more intake pumps to allow additional feedstock to be added without the need to interrupt the cracking process. In some embodiments, in-line filters may be added to remove unwanted contaminants from the feedstock.

Pump 110 may comprise one of a variety of fluid pumps suitable for incorporation into a system of the invention. Such pumps include, but need not be limited to, those manufactured by Viking Pump (Cedar Falls, Iowa). Throughputs suitable for the invention are greater than 0.05 gallons per minute, typically greater than 0.5 gallon per minute, more typically greater than 1 gallon per minute.

The methods and systems of the invention typically require compressed gasses, more typically compressed hydrogen. Compressed gasses suitable for use with the invention are commercially available for delivery in a tube trailer, or in standard compressed gas cylinders. Suppliers of compressed gasses include, but are not limited to, Praxair (Burr Ridge, Ill.). In some embodiments, it may be feasible to deploy a hydrogen generation facility for use with the invention. Such facilities may steam-reform natural gas, landfill gas, or digester gas to produce bulk hydrogen. Hydrogen generation facilities are commercially available from CB&I, Inc. (The Woodlands, Tex.). Hydrogen suitable for use in method described herein is at least about 98% pure, meaning that it has less than 2% non-hydrogen components. It may be advantageous to use hydrogen of a higher purity, for example, 99% pure, or 99.9% pure, or 99.99% pure.

The gas is mixed with the feedstock using an injector. Any method know to mix fluids at high pressures would be suitable, and the injector may be as simple as a "T" connector. Of course, other devices (e.g. needle valve) for introducing the compressed gas will be known to those of average skill in the art. One or more back-flow valves may be use to assure that the compressed gas does not force feedstock backward through pump 110 and into feedstock reservoir 105. The pressure of the compressed gas may be controlled with a variety of means, including, but not limited to regulators, flow controllers, and valves. Regulators suitable for use with the invention are available from Matheson Gas Products (Secaucus, N.J.).

While FIG. 1 shows the collection of product for later processing, a hydrocarbon synthesizer may additionally separate the products according to their vapor pressure (boiling point) using fractional distillation. That is, a particular range of hydrocarbons is allowed to condense at a given temperature and collected, while the remaining gaseous hydrocarbons are condensed at a different temperature and removed. The resulting fractions, or cuts, may be directly used as a fuel or as secondary feedstocks for other processes. For example, a naphtha cut may be certified to be sold as gasoline without further processing. In other embodiments, subsequent separation or processing will increase the value of the hydrocarbons. In still other embodiments, a gasoline cut may be taken separately from the naptha cut. See FIG. 5.

FIG. 3 shows an embodiment of the invention suitable for the production of hydrocarbon products and the subsequent separation of those products according to vapor pressure. Structures 105-145 are identical to those discussed above with respect to FIG. 1. However, product recovery reservoir 150 has been removed, allowing the products to pass to a first reboiler 310, which is maintained at a first temperature appropriate to recover a first fraction with a first upper limit of vapor pressure. The remaining product vapors, having boiling points below about a first temperature will pass on to a second reboiler 320, which is maintained at a second temperature appropriate to recover a second fraction with a second upper limit of vapor pressure. The remaining product vapors, having boiling points below about a second temperature will pass on to a third reboiler 330, which is maintained at a third temperature appropriate to recover a third fraction with a third upper limit of vapor pressure. The remaining product vapors, having boiling points below about a third temperature will pass on to a fourth reboiler 340, which is maintained at a fourth temperature appropriate to recover a fourth fraction with a fourth upper limit of vapor pressure. The remaining product vapors, having boiling points below about a fourth temperature will pass through the system via vent 350. In some embodiments, reboilers will have offtake valves and piping to allow the reboilers to be drained without interrupting the process.

Because the temperature of reboilers 310-340 may be independently controlled, the invention is not limited to the recovery of certain fractions. Additionally, it is feasible to reduce or increase the number of reboilers based upon the desired fractionation. Furthermore, vent 350 may be replaced with a freezer in order to recover the lightest fraction, containing mostly propanes.

The methods of fractional distillation are well known to those of skill in the art of petroleum refining. Accordingly, it is not intended that the invention be limited to the simple fractional distillation apparatus described in FIG. 3. One of ordinary skill in the art could readily implement more complicated fractional distillation equipment, comprising, for example, a packed-distillation column, a reboiler, and a condenser. Additionally, both atmospheric and vacuum distillation may be suitable to fractionate the mixed hydrocarbons formed using the systems and methods of the invention.

In one embodiment of FIG. 3, first reboiler 310 may be maintained at a temperature of about 550° F., second reboiler 320 may be maintained at a temperature of about 360° F., third reboiler 330 may be maintained at a temperature of about 270° F., and fourth reboiler 340 may be maintained at a temperature of about 160° F. This embodiment would thus result in a first fraction comprising residuum, fuel oils, and lubricants, a second fraction comprising kerosenes and diesel, a third fraction comprising heavy naphthas, and a fourth fraction comprising light naphthas. The fourth fraction would be suitable for use as a high-octane gasoline.

In another embodiment, shown in FIG. 5, the fractional distillation apparatus may comprise, for example, five reboilers, having a first temperature ($T_x$) and a second temperature ($T_x'$). As the hydrocarbon products leave the quench, they encounter a first region at temperature $T_1$, where hydrocarbon products having a boiling point higher than $T_1$ are condensed. Hydrocarbon products having a boiling point lower than $T_1$ escape the first region and encounter a second region of the first reboiler having a temperature $T_1'$. Hydrocarbon products having a boiling point lower than $T_1'$ escape the first reboiler, travelling to a first region of a second reboiler, with a temperature of $T_2$. Using this iterative process, it is possible to recover five fractions. For example, if $T_1$ and $T_1'$ are between 450-650° F., $T_2$ and $T_2'$ are between 315-410° F., and $T_3$ and $T_3'$ are between 220-315° F., $T_4$ and $T_4'$ are between 90-220° F., and $T_5$ and $T_5'$ are between 30-0° F., the resulting fractions will be residuum and diesel in the first reboiler, kerosene in the second reboiler, naphtha in the third reboiler, gasoline in the fourth reboiler, and propane and other gasses in the fifth reboiler.

Figure 4:
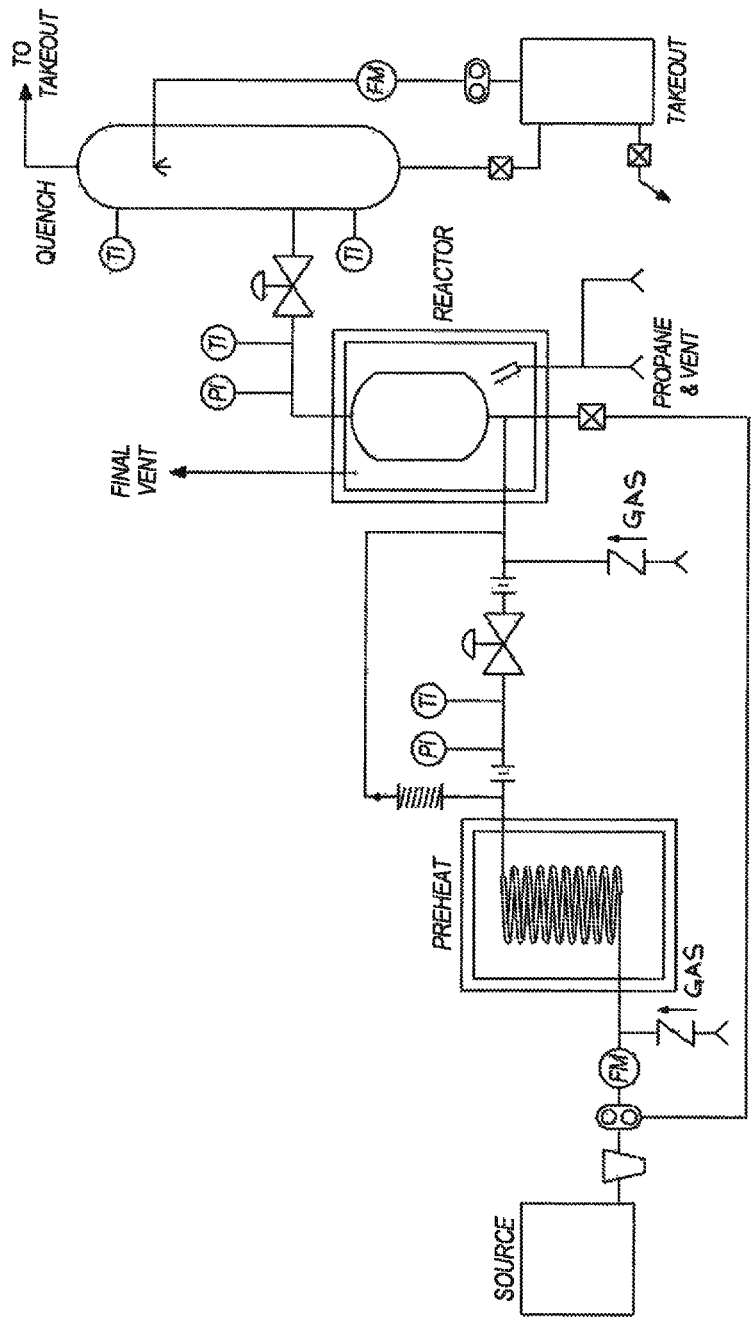
FIG. 4 shows an embodiment of a hydrocarbon synthesizer of the invention.

An embodiment of the invention that utilizes a distillation tower and a condenser is shown in FIG. 4. The embodiment additionally shows the inclusion of flow meters (FM), pressure indicators (PI), and temperature indicators (TI) to allow for greater control of the process. In some embodiments, the meters may be interfaced with one or more processors that will facilitate systems control by actuating one or more valves, the pressure of the high-pressure gas injector(s), or the temperature of the preheat and the reactor.

The preheat region, the reactor, and the fractional distillation apparatus may be powered from a number of energy sources, including electricity, biomass, natural gas, etc. The preheat region, the reactor, and the fractional distillation apparatus may also be heated from one or more lower-value fractions from the process, e.g., the propane fraction. In some embodiments, the heat from the invention may be recycled, or the invention co-cited with another process that produces excess heat that may be used for the preheat region, reactor, or fractional distillation apparatus. (For example, a power plant, or a paper mill, or an incinerator.) Additionally, the quench may be connected to an appropriate takeout from a reboiler to provide a heat sink. For example, if the quench contains recirculating naphtha, the recirculation loop may be connected to the takeout of a reboiler set to collect a naphtha fraction from hydrocarbon products. Other methods of recycling energy flows in embodiments of the invention are known to those of skill in the art.

It is to be understood that the invention is not limited in its application to the details of construction and the arrangement of components set forth in the previous description or illustrated in the drawings. The invention is capable of other embodiments and of being practiced or of being carried out in various ways. Also, it is to be understood that the phraseology and terminology used herein is for the purpose of description and should not be regarded as limiting.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

The invention is further described in the following Examples, which do not limit the scope of the invention.

EXAMPLES

Example 1

Hydrocarbon Fractions from Used Motor Oil

A hydrocarbon synthesizer similar to FIG. 3 was constructed and used to convert used motor oil to hydrocarbon fractions. A four gallon hydraulic fluid tank from a tractor (John Deere) was filled with used 10W-30 motor oil (various manufactures). A hydraulic pump (John Deere) pumped the used motor oil from the feedstock reservoir into the hydrocarbon synthesizer. The pump delivered used motor oil to the system at approximately 0.1 GPM. The hydrocarbon synthesizer employed ¼" O.D. 316 L stainless steel tubing and fittings from the pump to the reactor, and from the reactor to the product quench vessel. The tubing, fittings and valves were purchased from McMaster Carr (Elmhurst, Ill.).

A cylinder of compressed UHP Hydrogen (Praxair) was used as a source for compressed hydrogen. A custom hydrogen regulator (Matheson Gas Products) allowed for the controlled delivery of hydrogen at approximately 200 PSIG. The used motor oil and compressed hydrogen were mixed with a ¼" stainless steel "T" fitting. Both the feedstock feed line and the hydrogen feed line had back-flow valves previous to the "T" fitting. The high-pressure mixture of compressed hydrogen and used motor oil entered a feedstock preheat vessel comprising 100' of coiled ¼" O.D. 316 L stainless steel tubing (McMaster Carr) inside a 6 cubic foot electric pottery kiln (L&L Kiln, Swedesboro, N.J.). The feedstock preheat vessel was set to 1200° F.

Using a thermocouple at the exit of the feedstock preheat vessel, the mixture of hydrogen and used motor oil was measured to be 900° F. The hot, high pressure mixture of hydrogen and used motor oil then passed via ¼" O.D. 316 L stainless steel tubing to the expansion vessel, housed in a 4 cubic foot electric pottery kiln (L&L Kiln) set to 1300° F. Similar to FIG. 2, the expansion vessel comprised a 4" O.D., 1.5 gal stainless steel cylinder with a ¹⁄₃₂" stainless steel flow-restricting orifice at the entrance. Using a thermocouple at the exit of the reactor, the products were measured to be 1000° F.

The products exiting the reactor next encountered a product quench vessel, having a 4 gallon recirculating jacket of naphtha, with a nominal boiling point of 200° F. The exit to the product quench vessel and the remainder of the fractionation apparatus was interconnected with ½" O.D. 316 L stainless steel tubing (McMaster Carr).

Upon exiting the product quench vessel, the mixed hydrocarbon products continued to a series of reboilers constructed from modified 5 gal. Cornelius kegs (kegconnection.com) housed in gas ranges (Kenmore). The first reboiler was set to a temperature of 600° F. The fraction of the hydrocarbon product having a boiling point less than 600° F. moved to a second reboiler, constructed in an identical fashion. The second reboiler was set to a temperature of 350° F. The fraction of the hydrocarbon product having a boiling point less than 350° F. moved to a third reboiler, constructed in an identical fashion. The third reboiler was set to a temperature of 260° F. The fraction of the hydrocarbon product having a boiling point less than 260° F. moved to a fourth reboiler, constructed in an identical fashion. The fourth reboiler was set to a temperature of 150° F. The fraction of the hydrocarbon product having a boiling point less than 150° F. was collected in a liquid nitrogen cold trap for safe disposal.

At the completion of the hydrocarbon synthesis, the liquid fractions were removed from the reboilers. The fraction remaining in the first reboiler was dark brown with a high viscosity. The fraction remaining in the second reboiler was caramel colored, and had a lower viscosity than the first cut. The fraction remaining in the third reboiler was straw colored and had a water-like viscosity. The fraction remaining in the fourth reboiler was clear and smelled like gasoline. The fraction remaining in the fourth reboiler was analyzed by an independent fuels laboratory (Intertek) and found to have a research octane number of 98.1. Gas chromatographic analysis showed the presence of hundreds of different hydrocarbon compounds. The full analysis is duplicated in FIG. 6 A-D. A summary of the composition is given in Table 1:

TABLE 1

Composition of fourth cut from used motor oil.

| Hydrocarbon family | Percent composition (vol/vol %) |
|---|---|
| n-paraffins | 6.11 |
| i-paraffins | 46.23 |
| olefins | 2.67 |
| naphthenes | 14.69 |
| aromatics | 18.54 |
| oxygenates | 0.00 |

Example 2

Hydrocarbon Fractions from Refined Soybean Oil

A hydrocarbon synthesizer similar to FIG. 3 was constructed and used to convert refined soybean oil to hydrocarbon fractions. A four gallon hydraulic fluid tank from a tractor (John Deere) was filled with refined soybean oil (Wal-Mart). A hydraulic pump (John Deere) pumped the refined soybean oil from the feedstock reservoir into the hydrocarbon synthesizer. The pump delivered refined soybean oil to the system at approximately 0.1 GPM. The hydrocarbon synthesizer employed ¼" O.D. 316 L stainless steel tubing and fittings from the pump to the reactor, and from the reactor to the product quench vessel. The tubing, fittings and valves were purchased from McMaster Carr (Elmhurst, Ill.).

A cylinder of compressed UHP Hydrogen (Praxair) was used as a source for compressed hydrogen. A custom hydrogen regulator (Matheson Gas Products) allowed for the controlled delivery of hydrogen at approximately 200 PSIG. The refined soybean oil and compressed hydrogen were mixed with a ¼" stainless steel "T" fitting. Both the feedstock feed line and the hydrogen feed line had back-flow valves previous to the "T" fitting. The high-pressure mixture of compressed hydrogen and refined soybean oil entered a feedstock preheat vessel comprising 100' of coiled ¼" O.D. 316 L stainless steel tubing (McMaster Carr) inside a 6 cubic foot electric pottery kiln (L&L Kiln). The feedstock preheat vessel was set to 1200° F.

Using a thermocouple at the exit of the feedstock preheat vessel, the mixture of hydrogen and refined soybean oil was measured to be 900° F. The hot, high pressure mixture of hydrogen and refined soybean oil then passed via ¼" O.D. 316 L stainless steel tubing to the expansion vessel, housed in a 4 cubic foot electric pottery kiln (L&L Kiln) set to 1300° F. Similar to FIG. 2, the reactor comprised a 4" O.D., 1.5 gal stainless steel cylinder with a ¹⁄₃₂" stainless steel flow-restricting orifice at the entrance. Using a thermocouple at the exit of the reactor, the products were measured to be 1000° F.

The products exiting the reactor next encountered a product quench vessel, having a 4 gallon recirculating jacket of naphtha, with a nominal boiling point of 200° F. The exit to the product quench vessel and the remainder of the fractionation apparatus was interconnected with ½" O.D. 316 L stainless steel tubing (McMaster Carr).

Upon exiting the product quench vessel, the mixed hydrocarbon products continued to a series of reboilers constructed from modified 5 gal. Cornelius kegs (kegconnection.com) housed in gas ranges (Kenmore). The first reboiler was set to a temperature of 600° F. The fraction of the hydrocarbon product having a boiling point less than 600° F. moved to a second reboiler, constructed in an identical fashion. The second reboiler was set to a temperature of 350° F. The fraction of the hydrocarbon product having a boiling point less than 350° F. moved to a third reboiler, constructed in an identical fashion. The third reboiler was set to a temperature of 260° F. The fraction of the hydrocarbon product having a boiling point less than 260° F. moved to a fourth reboiler, constructed in an identical fashion. The fourth reboiler was set to a temperature of 150° F. The fraction of the hydrocarbon product having a boiling point less than 150° F. was collected in a liquid nitrogen cold trap for safe disposal. (There was noticeably more ice in the liquid nitrogen cold trap in Example 2 than Example 1.)

At the completion of the hydrocarbon synthesis, the liquid fractions were removed from the reboilers. The fraction remaining in the first reboiler was brown with a high viscosity. The fraction remaining in the second reboiler was straw colored, and had a lower viscosity than the first cut. The fraction remaining in the third reboiler was slightly yellow and had a water-like viscosity. The fraction remaining in the fourth reboiler was clear and smelled like gasoline. The fraction remaining in the fourth reboiler was analyzed by an independent fuels laboratory (Intertek) and found to have a research octane number of 95.2. Gas chromatographic analysis showed the presence of many different hydrocarbon compounds. The full analysis is duplicated in FIG. 7 A-B. A summary of the composition is given in Table 2:

TABLE 2

Composition of fourth cut from refined soybean oil.

| Hydrocarbon family | Percent composition (vol/vol %) |
|---|---|
| n-paraffins | 4.40 |
| i-paraffins | 44.80 |
| olefins | 0.0 |
| naphthenes | 31.22 |
| aromatics | 5.00 |
| oxygenates | 0.00 |

As an additional test of the suitability of the fourth soybean oil cut for a fuel, the fourth cut was used to power a commercial push lawn mower (Toro). Commercial gasoline was drained from the push mower and then approximately six ounces of the fourth cut from refined soybean oil were placed into the lawn-mower. The lawn-mower was run for approximately twenty minutes without a noticeable change in performance, as compared to the commercial gasoline.

Example 3

Hydrocarbon Fractions from Pyrolysis Oil from the Pyrolysis of Used Tires

A hydrocarbon synthesizer similar to FIG. 3 was constructed and used to convert pyrolysis oil to hydrocarbon fractions. A four gallon hydraulic fluid tank from a tractor (John Deere) was filled with oil from the pyrolysis of used automobile tires (Carbolytic Materials Company, Mayville, Mo.). A hydraulic pump (John Deere) pumped the pyrolysis oil from the feedstock reservoir into the hydrocarbon synthesizer. The pump delivered pyrolysis oil to the system at approximately 0.2 GPM. The hydrocarbon synthesizer employed 3/8" O.D. 316 L stainless steel tubing and fittings from the pump through the preheat section, from the reactor to the product quench vessel 1/2" pipe was used. The tubing, pipe, fittings and valves were purchased from McMaster Carr (Elmhurst, Ill.).

A cylinder of compressed commercial grade Hydrogen (Praxair) was used as a source for compressed hydrogen. A custom hydrogen regulator (Matheson Gas Products) allowed for the controlled delivery of hydrogen at approximately 200 PSIG. The pyrolysis oil and compressed hydrogen were mixed with a 1/4" to 1/2" stainless steel "T" fitting. Both the feedstock feed line and the hydrogen feed line had back-flow valves previous to the "T" fitting. The high-pressure mixture of compressed hydrogen and pyrolysis oil entered a feedstock preheat vessel comprising 125' of coiled 3/8" O.D. 316 L stainless steel tubing (McMaster Carr) inside a 6 cubic foot electric pottery kiln (L&L Kiln). The feedstock preheat vessel was set to 1000° F.

Using a thermocouple at the exit of the feedstock preheat vessel, the mixture of hydrogen and pyrolysis oil was measured to be 852° F. The hot, high pressure mixture of hydrogen and pyrolysis oil then passed via 1/2" O.D. 316 L stainless steel sch 40 pipe to the expansion vessel, housed in a 4 cubic foot electric pottery kiln (L&L Kiln) set to 1300° F. Similar to FIG. 2, the reactor comprised a 4" O.D., 1.5 gal stainless steel cylinder with a high pressure 1/2" stainless steel flow-restricting globe valve at the entrance. Using a thermocouple at the exit of the reactor, the products were measured to be 1050° F.

The products exiting the reactor next encountered a product quench vessel, having a 4 gallon recirculating jacket of naphtha, with a nominal boiling point of 200° F. The exit to the product quench vessel and the remainder of the fractionation apparatus was interconnected with 1/2" O.D. 316 L stainless steel tubing (McMaster Carr).

Upon exiting the product quench vessel, the mixed hydrocarbon products continued to a series of reboilers constructed from modified 5 gal. Cornelius kegs (kegconnection.com) housed in gas ranges (Kenmore). For this experiment all of the reboilers were turned off, however, and only the fraction of the hydrocarbon product having a boiling point less than 150° F. was collected in a cold trap. The amount of ice in the cold trap was similar to the amount found in Example 2.

At the completion of the hydrocarbon synthesis, the liquid fractions were removed from the reboilers. The fraction remaining in the first reboiler was brown with a low viscosity. The fraction remaining in the second reboiler was straw colored, and had a lower viscosity than the first cut. The fraction remaining in the third reboiler was slightly yellow and had a water-like viscosity. The fraction remaining in the fourth reboiler was nearly clear and smelled like gasoline. The fraction remaining in the cold trap was analyzed by an independent fuels laboratory (Intertek) and found to have a research octane number of 75.3. Gas chromatographic analysis showed the presence of many different hydrocarbon compounds. The full analysis is duplicated in FIG. 8 A-C. A summary of the composition is given in Table 3:

TABLE 3

Composition of fourth cut from pyrolysis oil.

| Hydrocarbon family | Percent composition (vol/vol %) |
|---|---|
| n-paraffins | 10.03 |
| i-paraffins | 17.94 |
| olefins | 28.54 |
| naphthenes | 34.87 |
| aromatics | 8.62 |
| oxygenates | 0.00 |

As an additional test of the suitability of the fourth pyrolysis oil cut for a fuel, the fourth cut was used to power a commercial push lawn mower (Toro). Commercial gasoline was drained from the push mower and then approximately six ounces of the fourth cut from pyrolysis oil were placed into the lawn-mower. The lawn-mower was run for approximately twenty minutes without a noticeable change in performance, as compared to the commercial gasoline.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention is further described in the following claims:

What is claimed is:

1. A method of synthesizing hydrocarbon products from a hydrocarbon feedstock, the method comprising:
    mixing hydrogen gas with a liquid hydrocarbon feedstock to create a liquid mixture;
    heating the liquid mixture;
    expanding the liquid mixture through a flow-restricting orifice and into an expansion vessel at a temperature of greater than 800° F. (430° C.) and a pressure of greater than 120 PSIG (0.83 MPa) to crack hydrocarbons in the mixture to create hydrocarbon intermediates; and
    quenching the hydrocarbon intermediates to form hydrocarbon products.

2. The method of claim 1, wherein the liquid mixture is heated to at least 500° F. (260° C.) with a preheat vessel.

3. The method of claim 1, wherein the liquid hydrocarbon feedstock is heated with a preheat vessel to create a hot liquid hydrocarbon feedstock, and the hot liquid hydrocarbon feedstock is mixed with the hydrogen gas to heat the liquid mixture.

4. The method of claim 1, further comprising separating hydrocarbon fractions from the hydrocarbon products.

5. The method of claim 4, wherein the hydrocarbon fractions are separated from the hydrocarbon products with a distillation tower.

6. The method of claim 4, wherein the hydrocarbon fractions comprise natural gas, petroleum ether, gasoline, kerosene, fuel oil, lubricants, asphalt or a combination thereof.

7. The method of claim 1, wherein the liquid hydrocarbon feedstock is pyrolysis oil, crude oil, petroleum, residuum, tar, used motor oil, plant oil, vegetable oil, or a combination thereof.

8. The method of claim 1, wherein the liquid hydrocarbon feedstock is pyrolysis oil, used motor oil, or soybean oil.

9. The method of claim 1, wherein the liquid mixture is expanded through the flow-restricting orifice at a temperature of greater than 900° F. (480° C.) and a pressure of greater than 200 PSIG (1.38 MPa).

10. The method of claim 1, wherein the flow-restricting orifice has an opening smaller than 3 mm in diameter.

* * * * *